(12) United States Patent
Myllymaki

(10) Patent No.: US 9,598,558 B2
(45) Date of Patent: Mar. 21, 2017

(54) NANODIAMOND CONTAINING COMPOSITE AND A METHOD FOR PRODUCING THE SAME

(71) Applicant: Carbodeon Ltd Oy, Vantaa (FI)

(72) Inventor: Vesa Myllymaki, Helsinki (FI)

(73) Assignee: Carbodeon Ltd Oy, Vantaa (FI)

(*) Notice: Subject to any disclaimer, the term of this patent is extended or adjusted under 35 U.S.C. 154(b) by 610 days.

(21) Appl. No.: 14/141,779

(22) Filed: Dec. 27, 2013

(65) Prior Publication Data

US 2016/0102188 A1    Apr. 14, 2016

(51) Int. Cl.
  *C08K 3/38*  (2006.01)
  *C09K 5/08*  (2006.01)
  *C08K 3/04*  (2006.01)
  *C09C 3/00*  (2006.01)

(52) U.S. Cl.
  CPC .......... *C08K 3/38* (2013.01); *C08K 3/04* (2013.01); *C09C 3/00* (2013.01); *C09K 5/08* (2013.01); *C08K 2003/385* (2013.01); *C08K 2201/011* (2013.01)

(58) Field of Classification Search
  None
  See application file for complete search history.

(56) References Cited

U.S. PATENT DOCUMENTS

| 2010/0022423 A1 | 1/2010 | Lu et al. |
| 2010/0140562 A1 | 6/2010 | Shenderova et al. |
| 2010/0233465 A1* | 9/2010 | Wu ............ G03G 15/2057 428/323 |
| 2011/0006218 A1* | 1/2011 | Mochalin ............ B82Y 30/00 250/459.1 |
| 2011/0252712 A1 | 10/2011 | Chakraborty et al. |
| 2012/0102843 A1 | 5/2012 | Chakraborty et al. |
| 2013/0206273 A1 | 8/2013 | Guest et al. |

FOREIGN PATENT DOCUMENTS

| JP | 2006206634 | 8/2006 |
| KR | 20120059115 | 6/2012 |

OTHER PUBLICATIONS

Sirotinkin et al. "Model of Formation of Three-Dimensional Polyurethane Films Modified by Detonation Nanodiamonds" Physics of the Solid Stats, vol. 46(4), 2004, pp. 746-747.*
http://www.carbodeon.net/index.php/en/applications, 6 pages, website page generated Feb. 2016.*
Gavin Farmer "Carbodeon NanoMaterials Realising Diamond Superior Potential Within Thermal Management", 34 pages, Nov. 13, 2013.*
Mochalin et al. "The properties and applications of nanodiamonds" Nature Nanotechnology, vol. 7, 2012, pp. 11-23.*
International search report dated Jul. 15, 2015.

(Continued)

*Primary Examiner* — Robert S Loewe
(74) *Attorney, Agent, or Firm* — Berggren Inc.

(57) ABSTRACT

A method for producing a composition comprising at least one filler and a nanodiamond material, and a composition comprising a nanodiamond material and at least one filler is disclosed. Further, a method for producing a nanodiamond containing thermal composite, and a nanodiamond containing thermal composite comprising nanodiamond material, at least one filler and at least one polymer is disclosed.

61 Claims, 2 Drawing Sheets

(56) References Cited

OTHER PUBLICATIONS

Jakob Hees et al. Electrostatic self-assembly of diamond nanoparticles. Chem. Phys. Lett. Elsevier BV. NL. vol. 509. No. 1.
Xuezhang Liu et al. Enhanced diamond nucleation on copper substrates by employing an electrostatic self-assembly seeding process with modified nanodiamond particles. Colloids and SUrfaces A: Physicochemical and engineering aspects. vol. 412, Jun. 26, 2012, pp. 82-89.
Sven Lange et al. Immobilization of diamond nanocrystals on graphene. MRS Proceedings. vol. 1597, Nov. 13, 2013.
Finnish Patent and Registration Office Search Report dated Sep. 16, 2014.
Nunes D. et al. Prosecution of Cu/diamond composites for first-wall heat sinks, fusion Engineering and Design, vol. 86. 2011, 2589-2592 chapters 2 and 3, figure 4.
Farmer, G., Carbodeon NanoMaterials: Realising Diamond Superior Potential within Thermal Management, http://materialweek.fi/file/Kokkola-Material-Week-2013-NanoKokkola-Gavin-Farmer-Carbodeon-Company-Presentation.pdf, (retrieved Sep. 3, 2014), according to Google data range published on Internet Nov. 2013 pp. 19-21.
Kato, H. et al. Preparation and characterization of stable dispersions of carbon black and nanodiamond in culture medium for in vitro toxicity assessment. Carbon, vol. 49. 2011, 3989-3997, tables 1 and 3.
Ebadi-Dehaghani, et al., Thermal Conductivity of Nanoparticles Filled Polymers, Smart Nanoparticles Technology, InTech. 2012, pp. 519-541, www.intechopen.com/books/smart-nanoparticles-technology/thermal-conductivity-ofnanoparticles-filled-polymers.

\* cited by examiner

NANODIAMOND CONTAINING COMPOSITE AND A METHOD FOR PRODUCING THE SAME

FIELD OF THE INVENTION

The present invention relates to a method for producing a composition comprising at least one filler and nanodiamond material, and to a composition comprising nanodiamond material and at least one filler. The present invention further relates to a method for producing a nanodiamond containing thermal composite, and to a nanodiamond containing thermal composite comprising nanodiamond material, at least one filler and at least one polymer.

BACKGROUND ART

Nanodiamond (ND) also referred to as ultrananocrystalline diamond or ultradispersed diamond (UDD) is a unique nanomaterial which can be produced in hundreds of kilograms by detonation synthesis. These nanodiamonds are called detonation nanodiamonds.

Synthetic nanodiamonds can be produced by several known methods, such as chemical vapour deposition or high pressure.

Detonation nanodiamonds were first synthesized by researchers from the USSR in 1963 by explosive decomposition of high-explosive mixtures with negative oxygen balance in a non-oxidizing medium. A typical explosive mixture is a mixture of trinitrotoluene (TNT) and hexogen (RDX), a preferred weight ratio of TNT/RDX is 40/60.

As a result of the detonation synthesis a diamond-bearing soot also referred to as detonation blend is obtained. This blend comprises nanodiamond particles, which typically have an average particle size of about 2 to 8 nm, and different kinds of non-diamond carbon contaminated by metals and metal oxide particles coming from the material of the detonation chamber and used explosives. The content of nanodiamonds in the detonation blend is typically between 30 and 75% by weight.

The nanodiamond-containing blends obtained from the detonation contain same hard agglomerates, typically having a diameter of above 1 mm. Such agglomerates are difficult to break. Additionally the particle size distribution of the blend is very broad, ranging typically from several to tens of microns.

The diamond carbon comprises $sp^3$ carbon and the non-diamond carbon mainly comprises $sp^2$ carbon species, for example carbon onion, carbon fullerene shell, amorphous carbon, graphitic carbon or any combination thereof.

There are number of processes for the purification of the detonation blends. The purification stage is considered to be the most complicated and expensive stage in the production of nanodiamonds.

For isolating the end diamond-bearing product, use is made of a complex of chemical operations directed at either dissolving or gasifying the impurities present in the material. The impurities, as a rule, are of two kinds: non-carbon (metal oxides, salts etc.) and non-diamond forms of carbon (graphite, black, amorphous carbon).

Chemical purification techniques are based on the different stability of the diamond and non-diamond forms of carbon to oxidants. Liquid-phase oxidants offer an advantage over gas or solid systems, because they allow one to obtain higher reactant concentrations in the reaction zone and, therefore, provide high reaction rates.

In the recent years detonation nanodiamonds have received more and more attention due to several existing applications within electroplating (both electrolytic and electroless), polishing, various polymer mechanical and thermal composites, CVD-seeding, oils and lubricants additives as well as possible new applications such as luminescence imaging, drug delivery, quantum engineering etc. Their usability is based on the fact that the outer surface of detonation nanodiamond, as opposite to for example nanodiamonds derived from micron diamonds by crushing and sieving, is covered with various surface functions.

Recently, use of nanodiamonds in polymers for thermal management has been studied.

Heat generated, for example by electronic devices and circuitry must be dissipated to improve reliability and prevent premature failure. Techniques for heat dissipation can include heat sinks and fans for air cooling, and other forms of cooling such as liquid cooling. Depending on the application, the heat sinks can be made of metal, or ceramic materials, but sometimes also out of polymeric materials. The latter constitute typically thermal greases alike silicones and epoxides thermal interface materials, used typically to adhere the circuits into the device structure itself. When it comes to for example casings of such devices, also thermoplastic thermal composites are used for the overall thermal management throughout the device. Polycarbonate and silicones are also used as LED encapsulants, also an area wherein more efficient thermal management is becoming more and more an issue. Generally, thermoplastic materials are applied in so called secondary polymer based heat sinks and thermosets like silicones in Thermal Interface Materials (TIM), also referred as primary polymer based heat sinks.

The increasing use of polymer materials is based on simple facts of reducing the device weight, and its cost. Moreover, thermally conductive plastics typically boast lower coefficients of thermal expansion (CTE) than for example aluminum and can thereby reduce stresses due to differential expansion, since the plastics more closely match the CTE of silicon or ceramics that they contact. If the contact between the thermal compound and silicon/ceramics surface is altered, that will have an adverse effect on the component function and life-time. Polymer composites offer also design freedom for molded-in functionality and parts consolidation; and they can eliminate costly post-machining operations. The use of polymeric materials is however limited by their native thermal conductivity properties, reaching typically thermal conductivity values of only around 0.2 W/mK.

For example, miniaturization of electronic chips has become an important topic for development of integrated circuit. Because sizes of electronic elements become smaller, and their operating speeds become faster, how to dissipate the heat generated by an electronic element during operation so as to maintain its working performance and stability has become one of the points for research.

Several methods to improve polymer thermal conductivity properties have been presented. If preparing thermal solutions that are at the same time electrically insulating, the present solutions are based on use of various ceramic particles, including alumina, hexagonal and cubic boron nitride, aluminum nitride, carbides like boron carbide etc. In solutions being at the same thermally and electrically insulating, various forms of graphitic and amorphous carbon including graphite, graphene, carbon fibers, pyrolytic carbon, carbon nanotubes, micron diamonds and nanodiamonds derived from micron sized diamonds via crushing and sieving are applied as thermal filler. Also metal particles alike various sized silver particles are readily applied for making high efficiency thermal management solutions.

If the added filler materials cannot be distributed evenly into the polymer matrix, but are forming heavy agglomerates in the produced matrix, the use of additives may also result in poorer mechanical and thermal properties as in initial, native polymer material. This problem gets more and more severe, the higher the total content of various fillers in a ready polymer composite is rising. Moreover, the higher the content of various inorganic or metallic particles, the higher is the compound cost, the higher is the wear of used processing tools, and the higher is the weight of produced compounds.

As the polymer based heat sink thermal conductivity is dependent on the used materials thermal conductivity but also on the boundary thermal conductivity between the parent polymer and added thermal filler particles, the wetting or coupling effect between the thermal particle surface and parent polymer material is having a big impact on received compound thermal conductivities. It is commonly known that the especially the present ceramic and metal fillers exhibit remarkably inert surface properties having an impaired effect on said wetting or coupling of particles into parent polymer(s), having an adverse effect on received compound thermal conductivities.

Typically, thermal conductivity is measured both in-plane and through-plane of a material, the in-plane conductivity featuring normally higher thermal conductivity values than the through-plane conductivity. Generally, anisotropic fillers such as hexagonal boron nitride and graphite are applied for improving the in-plane thermal conductivities and isotropic, spherical fillers such as alumina particles to improve thermal conductivities both in in-plane and through-plane directions. The used fillers are selected according to application need.

In-plane and through-plane thermal conductivities can be determined by Laser Flash method. The other method measuring the thermal conductivity is by Hot Disk method, giving a value for the average thermal conductivity only.

The electric properties of thermal composites can be tuned by selecting either dielectric or electrically conducting filler additives. Typically, for generating the phonon percolation throughout the thermal composite, the additive total concentrations are very high, starting from 20% but exceeding also concentrations of 80%. Some of the most advanced thermal composites can contain several of the above mentioned fillers.

There are upper limits on present thermal conductivities, and it is difficult to improve these further due to already extremely high filler contents. Excess filler content is detrimental for the polymer composite's other important properties, such as mechanical properties and weight. When certain filler loading is exceeded, the used polymer loses its wetting ability and the compound breaks up into powder or fragmented pieces.

Therefore, there have been attempts to replace a portion of the filler materials with nanodiamonds for improving thermal conductivities of polymer composites.

US 2010/0022423 A1 discloses use of nanodiamonds to increase thermal conductivity in a polymeric material (polymeric grease). The nanodiamond thermal grease comprises nanodiamond powder, thermal powder and a substrate. The nanodiamond powder has volume percentage of 5% to 30%, the thermal powder of 40% to 90%, and the substrate of 5% to 30%.

The polymeric grease disclosed in US 2010/0022423 A1 has high nanodiamond and thermal powder (filler) content, and low substrate content. Because the filler and nanodiamond content compared to the substrate content is high the disadvantages of high filler content are still present.

US 2010/0022423 A1 further discloses a method for manufacturing nanodiamond thermal grease. First a substrate is heated, and then nanodiamond powder is put into the preheated substrate. A disperser is used to disperse the nanodiamond powder in the substrate. Thermal powder is put into the mixture of the substrate and nanodiamond, and the mixture is blended to form nanodiamond thermal grease.

US 2013/0206273 A1 describes a polymer matrix nanocomposite and a method for manufacturing the nanocomposite. Nanoparticle such as nanodiamond may be formulated as a solution or dispersion and cast or coated, or mechanically dispersed into a polymer resin matrix. The nanoparticle may also be blended with filler particles such as mica and carbon black. Blending and dispersion of the filler and the polymer resin may be accomplished by methods such as extrusion, shear mixing, three roll milling etc.

With the methods of US 2010/0022423 A1 and US 2013/0206273 A1 it is difficult to evenly distribute the nanodiamond particles and the filler into the polymer matrix. Uneven distribution leads to poor properties such as thermal conductivities and mechanical properties.

Publication H. Ebadi-Dehaghani, M. Nazempour, Thermal Conductivity of Nanoparticles Filled Polymers, Smart Nanoparticles Technologies, 2012, 519-540 discusses thermal conductivity of nanoparticles filled polymers. Improved thermal conductivities of polymers filled with nanosized filler materials, such as graphite, boron nitride and carbon nanotubes, are disclosed in the publication. However, nanodiamonds are not mentioned in the publication as a filler material for improving thermal conductivity of polymers.

Based on above there is a need for a nanodiamond containing thermal composite having improved thermal conductivities, preferably without impaired other important properties. There is an identified need to lower the overall weight of the thermal composites and to reduce the wear of processing tools used for composite manufacturing. Moreover, especially in solutions applied in automotive and other means of transportation, there is a simultaneous need to improve the manufactured composite mechanical properties. Further, the importance of polymer thermal compounds within automotive and other means of transportation is getting more and more pronounced as these devices are electrically powered. Within automotive sector, there is an emerging need to find solutions related especially to E-drive and used battery solutions.

In a preferred case, the nanodiamond containing thermal composites should bring the same or improved thermal properties with reduced overall composite production cost. Hence, the nanodiamond containing thermal composites should be available with remarkably low nanodiamond additions.

Moreover, there is a need for an improved process for producing nanodiamond containing thermal composites having improved thermal conductivities. The nanodiamond containing thermal composites should also be easy and cheap to manufacture and readily adaptable to various thermal applications.

SUMMARY OF THE INVENTION

The present invention relates to a method for producing a composition comprising at least one filler and nanodiamond material according to claim 1.

The present invention further relates to a method for producing a nanodiamond containing thermal composite according to claim 17.

The present invention additionally relates to a composition comprising nanodiamond material and at least one filler according to claim 33.

In addition the present invention relates to a nanodiamond containing thermal composite comprising nanodiamond material, at least one filler and at least one polymer according to claim 47.

It has now been surprisingly found that when nanodiamond containing dispersion or suspension is brought into contact with filler material(s) and from the produced suspension liquid medium is removed and the resulting composition is mixed with polymer(s), a nanodiamond containing thermal composite is obtained with improved thermal properties, such as in-plane and through-plane conductivities.

The improved thermal properties are due to the steps of the process of the present invention where the nanodiamond containing dispersion or solution is brought into contact with filler material(s) followed by removal of the liquid medium resulting in a composition wherein nanodiamond material adhere into filler material(s) surface and act as coupling agents between the filler material(s) and parent polymer(s). Such coupling effect is available due to nanodiamond surface functionalization, adaptable to both filler material(s) and parent polymer(s).

It has now been surprisingly found that both positively and negatively charged nanodiamond material particles, such as amino-functionalized nanodiamonds or carboxyl acid functionalized nanodiamond particles, aggregate on filler particles alike hexagonal boron nitride carrying negative zeta potential. The phenomena, although in less extent manor, was surprisingly found also on using less polar, hydrogen terminated nanodiamond particles.

It has now been surprisingly found that applying also nanodiamond containing nanodiamond blend materials, containing nanodiamonds embedded in graphitic and amorphous carbon matrix, aggregate on filler particles alike graphite, generating coupling effect between the filler material(s) and parent polymer(s). The effect can be fine-tuned by selecting the surface functionalization of applied nanodiamond material, containing both the surface functionalized nanodiamonds and surface functionalized graphitic and amorphous matrix.

The nanodiamond containing thermal composite of the present invention conducts thermal energy more efficiently because the nanodiamond material and filler particles are in better interaction and distributed more uniformly in polymer matrix compared to known solutions. Depending on the choice of nanodiamond material, its added concentration, choice of other filler(s) and parent polymer(s), part of the added nanodiamond material can also distributed into parent polymer as its distinctive material, allowing further fine-tuning of both in-plane, through plane and thus, average thermal conductivities.

DETAILED DESCRIPTION OF THE INVENTION

Figure 1:
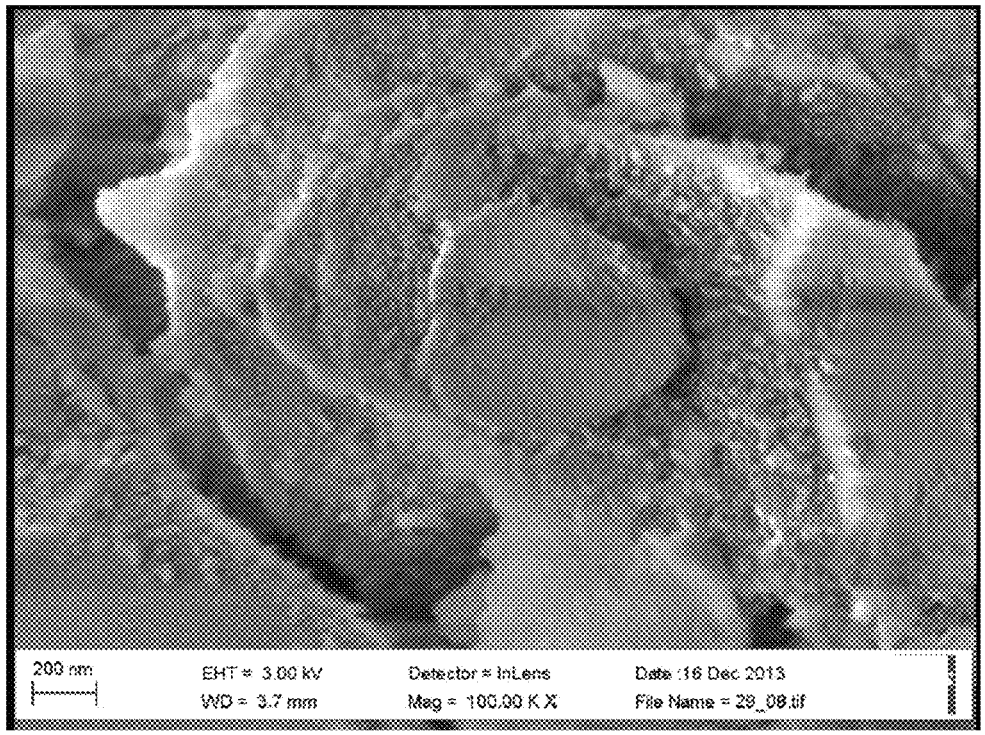
FIG. 1 shows PA-66 thermal composite based on 20 wt. % overall filler loading, wherein the nanodiamond material has been ball milled as dry powder together with hexagonal boron nitride filler. The compound nanodiamond concentration is 1.5 wt. % and hexagonal boron nitride concentration is 18.5 wt. %.

In a first aspect of the present invention there is provided a method for producing a composition comprising at least one filler and nanodiamond material.

More particularly there is provided a method for producing a composition comprising at least one filler and nanodiamond material, wherein the method comprises (i) nanodiamond material containing liquid medium is brought into contact with at least one filler for producing a suspension; (ii) the liquid medium is removed from the suspension of step (i) for producing the composition comprising at least one filler and nanodiamond material.

In the step (i) nanodiamond material containing liquid medium is brought into contact with at least one filler for producing a suspension comprising the at least one filler, nanodiamond material and a liquid medium.

By the wording "brought into contact" is meant herein any known method to bring the nanodiamond material containing liquid medium into contact with the at least one filler. Example of such method is mixing, for example with magnetic stirrer, the nanodiamond material containing liquid medium with the at least one filler. Another examples is spraying the nanodiamond material containing liquid medium on the at least one filler.

In a preferred embodiment the nanodiamond material containing liquid medium is mechanically mixed with the at least one filler. Preferably the mixing is performed with speed mixer.

The nanodiamond material containing liquid medium may be brought into contact with a filler, or mixture of two or more fillers.

The filler has preferably an average primary particle size from 10 nm to 2000 μm, more preferably 50 nm to 500 μm and even more preferably 500 nm to 200 μm.

The filler size is selected typically selected by application and cost.

The filler form can be anisotropic or isotropic, or a mixture thereof.

The filler form can be regular or irregular.

The filler surface can be native or activated with various species or treatments.

The filler may be thermally conductive and/or electrically conductive, or a mixture thereof.

Preferably the filler is selected from the group consisting of metal, metal oxide, metal nitride, metal carbide, carbon compound, silicon compound, boron compound such as boron nitride, ceramic materials, natural fibers, or the combinations thereof.

The carbon compound is selected from the group consisting of diamond material other than detonation diamond, graphite, carbon black, carbon fiber, graphene, oxidized graphene, carbon soot, carbon nanotube, pyrolytic carbon, silicon carbide, aluminum carbide, carbon nitride, or the combinations thereof.

The boron compound is selected from the group consisting of hexagonal or cubic boron nitride, boron carbide, or the combinations thereof. Preferably the boron compound is hexagonal boron nitride.

In one embodiment the filler is a mixture of boron nitride and aluminum oxide.

In one further embodiment the filler is a mixture of aluminum oxide and graphite. In one further embodiment the filler is boron nitride and graphite.

The nanodiamond material containing liquid medium in step (i) may be in a form of dispersion, i.e. the nanodiamond material particles are substantially in single digit form in the liquid medium.

The nanodiamond material containing liquid medium in step (i) may also be in a form of suspension, i.e. the nanodiamond material particles are in part or substantially in agglomerated form in the liquid medium.

Preferably the nanodiamond material containing liquid medium in step (i) is in form of dispersion.

The nanodiamond material containing liquid medium nanodiamond material concentration can be adjusted.

The nanodiamond material is detonation nanodiamond material. That is, the nanodiamonds are produced by detonation method. In other words, the nanodiamonds originate from detonation synthesis. As the nanodiamonds originate from detonation synthesis the surface of nanodiamond material particles can contain several surface functionalities, such as amino, carboxylic acid and hydrogen functionalities.

Precursor nanodiamond material may be essentially pure nanodiamond material, preferably having a nanodiamond content of at least 87% by weight, more preferably at least 97% by weight. The nanodiamond material may contain graphite and amorphous carbon originating from the production of the nanodiamonds. They may also contain some residual metal impurities, either as metals, metal salts or in metal oxide, nitride or halogenate form.

In one embodiment of the present invention the nanodiamond material may include detonation soot such as graphitic and amorphous carbon, the content of oxidisable carbon preferably being at least 5 wt.-%, more preferably at least 10 wt.-%.

Preferably zeta-potential value of the nanodiamond material exceeds ±35 mV as dispersed into water.

When the nanodiamond material is comprised of nanodiamond blend, reliable determination of nanodiamond blend material zeta-potential with presently available tools is challenging.

In one embodiment, surface of the nanodiamond material particles are functionalized to increase adherence into filler material surface. An example of such functionalized nanodiamond material particles is amino-functionalized nanodiamond material. Another example of such functionalized nanodiamond is carboxylic acid functionalized nanodiamond material particles, and still another example of such nanodiamond is hydrogen terminated nanodiamond material particles. Further examples of such functionalized nanodiamond material particles include hydroxyl-, thiol-, halogen-, ketone-, ester-, ether-, silyl-, epoxy-, cyano- and aldehyde functionalized nanodiamond material particles. The surface function is preferably covalently bound directly to nanodiamond material surface, but can also be located at a chain structure, this chain structure being covalently bound to nanodiamond material particle surface. Nanodiamond material particles are preferably functionalized predominantly with one type of active surface function, but can contain also two or several types of surface functions.

The adherence into filler material surface can be adjusted by using one or several types of surface functionalized nanodiamond material particles.

Further, the adherence into parent polymer material(s) can be adjusted by using one or several types of surface functionalized nanodiamond material particles.

The nanodiamond material nanodiamond particles in single digit form have an average primary particle size of from 1 nm to 10 nm, preferably from 2 nm to 8 nm, more preferably from 3 nm to 7 nm, and most preferably from 4 nm to 6 nm. Particle size of agglomerated form is between 5 nm and 10000 nm, preferably between 60 nm and 800 nm.

The liquid medium may be any suitable liquid medium. In one embodiment the liquid medium is selected from the group consisting of polar protic solvents, polar aprotic solvents, dipolar aprotic solvents, organic solvents or a mixture of the solvents.

The polar protic solvent is water, alcohol, linear aliphatic diol, branched diol and/or carboxylic acid.

The polar aprotic solvent is dichloromethane, tetrahydrofuran, propylene carbonate and/or lactam.

The dipolar aprotic solvent is ketone, ester, N,N-methylformamide and/or dimethyl sulfoxide.

The organic solvent is toluene or another aromatic solvent.

In a preferred embodiment the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), or a mixture of any said solvents.

Most preferably the liquid medium is water.

In one embodiment the suspension comprising the nanodiamond material, the at least one filler and the liquid medium is pre-treated prior step (ii). Preferably, the composition is subjected to ultrasonication to reduce particle size distribution of the suspension.

In another embodiment of the suspension comprising the nanodiamond material, the composition is subjected to mechanical milling to reduce particle size distribution of the suspension.

In still another embodiment of the suspension comprising the nanodiamond material, the composition is subjected to BASD milling to reduce particle size distribution of the suspension.

In step (ii) the liquid medium is removed from the suspension of step (i) for producing the composition comprising at least one filler and nanodiamond material.

The removal of the liquid medium can be performed with any suitable method. Examples of such methods are drying at elevated temperature and/or vacuum.

In a preferred embodiment the composition after the liquid medium removal is substantially dry.

In one embodiment of the composition, the nanodiamond material has substantially adhered to surface of at least one filler material, but the liquid medium content is still above 10 wt. %.

With the method of the present invention the nanodiamond material substantially adheres on surface of the at least one filler material.

Active surface area of the composition produced by the method of the present invention is lower than active surface area of a composition that has been produced only by mixing dry nanodiamond material and filler material. That is, active surface area of the composition produced by the method of the present invention is lower, preferably at least 5% lower, than active surface area of a composition without the substantial adherence of nanodiamond material on surface of at least one filler material.

The comparison of the active surface area of the compositions is done with compositions having same amounts of nanodiamond material and filler material. Only difference is the method the composition is produced; method of the present invention and composition that has been produced only by mixing dry nanodiamond material and filler material.

Active surface area can be measured by for example BET-method.

The zeta-potential of composition is different to that of filler material. The zetapotential is driven in direction of composition contained nanodiamond material. Hence, the composition zeta-potential is predominantly determined by nanodiamond material particle zeta-potential properties on the composition contained filler particle surfaces.

The surface charge of composition is different to that of filler material. The surface charge is driven in direction of composition contained nanodiamond material.

Hence, the composition surface charge is predominantly determined by nanodiamond material particle surface charge properties on the composition contained filler particle surfaces.

The composition contained particles surface properties affect the composition electrostatic interaction towards parent polymer(s) and facilitate the improved phonon transfer and thus, thermal conductivity throughout the formed thermal compound matrix.

Adhered nanodiamond material particle agglomerate size is less than 500 nm, preferably less than 300 nm, more preferably less than 100 nm and most preferably less than 50 nm.

In one embodiment, the nanodiamond material particle agglomerate size can exceed 500 nm.

In one further embodiment of invention, the nanodiamond material particle agglomerate size is exceeding 500 nm, and the nanodiamond material is nanodiamond particle contained nanodiamond blend material.

In the composition comprising the at least one filler and nanodiamond material, the nanodiamond material on the filler surface is able to generate coupling effect to another material. The another material is selected from group of polymers, metals, ceramic materials or their mixtures.

In one embodiment the produced composition comprising the at least one filler and the nanodiamond material is further treated by subjecting the composition to mechanical treatment to break up formed composition agglomerates.

Preferably the mechanical treatment is beads milling. Beads milling, or bead milling, is a commonly used term and known for a skilled person.

A beads mill is a type of a mechanical grinder. It is a cylindrical device used in grinding (or mixing) various materials. The mills are filled with the material to be ground and grinding media. Different materials are used as grinding media, including ceramic balls, flint pebbles and stainless steel balls. An internal cascading effect reduces the material to a fine powder. Beads mills can operate continuously or periodically.

Beads mill apparatuses can be operated with pass or re-circulation method. In the pass method the material is fed to the mill at one end and discharged at the other end. In the re-circulation method the material to be grinded circulates in the system until required particle size is obtained. The smaller the grinding media particles are the smaller is the particle size of the final product. At the same time, the grinding media particles should be larger than the largest pieces of the material to be ground.

A grinding chamber of a beads mill can also be filled with an inert shield gas, such as nitrogen, that does not react with the material being ground, to prevent oxidation or explosive reactions that could occur with ambient air inside the mill.

The beads for the beads mill are chosen so that the milled particles will have a suitable diameter. The beads milling is run until a suitable particle size is obtained.

The beads milling may be performed in dry or wet conditions. In wet conditions the composition is suspended in a liquid medium, and the formed suspension is beads milled. The beads milling of the suspension can be assisted by ultrasonication. That is, the suspension is simultaneously beads milled and treated with ultrasonication. Combined beads milling and ultrasonication is also known as a beads assisted sonic disintegration process (BASD process). The ultrasonication can be kept on during the whole milling or switched off at any stage, and optionally switched on again. The liquid medium is removed after the beads milling with known methods for producing beads milled composition.

In a second aspect of the present invention there is provided a method for producing a nanodiamond containing thermal composite.

More particularly there is provided a method for producing nanodiamond containing thermal composite wherein the method comprises (i) nanodiamond material containing liquid medium is brought into contact with at least one filler for producing a suspension; (ii) the liquid medium is removed from the suspension of step (i) for producing a composition comprising at least one filler and nanodiamond material; (iii) the composition of step (ii) and at least one polymer are mixed for producing the nanodiamond containing thermal composite.

In the step (i) nanodiamond material containing liquid medium is brought into contact with at least one filler for producing a suspension comprising the at least one filler, nanodiamond material and a liquid medium.

By the wording "brought into contact" is meant herein any suitable method to bring the nanodiamond material containing liquid medium into contact with the at least one filler. Example of such method is mixing, for example with magnetic stirrer, the nanodiamond material containing liquid medium with the at least one filler. Another examples is spraying the nanodiamond material containing liquid medium on the at least one filler.

In a preferred embodiment the nanodiamond material containing liquid medium is mechanically mixed with the at least one filler. Preferably the mixing is performed with speed mixer.

The nanodiamond material containing liquid medium may be brought into contact with a filler, or mixture of two or more fillers.

The filler has preferably an average primary particle size from 10 nm to 2000 µm, more preferably 50 nm to 500 µm and even more preferably 500 nm to 200 µm.

The filler may be thermally conductive and/or electrically conductive, or a mixture thereof.

Preferably the filler is selected from the group consisting of metal, metal oxide, metal nitride, metal carbide, carbon compound, silicon compound, boron compound such as boron nitride, ceramic materials, natural fibers, or the combinations thereof.

The carbon compound is selected from the group consisting of diamond material other than detonation diamond, graphite, carbon black, carbon fiber, graphene, oxidized graphene, carbon soot, carbon nanotube, pyrolytic carbon, silicon carbide, aluminum carbide, carbon nitride, or the combinations thereof.

The boron compound is selected from the group consisting of hexagonal or cubic boron nitride, boron carbide, or the combinations thereof. Preferably the boron compound is hexagonal boron nitride.

In one embodiment the filler is a mixture of boron nitride and aluminum oxide.

In one further embodiment the filler is a mixture of boron nitride, aluminum oxide and graphite.

The nanodiamond material containing liquid medium in step (i) may be in a form of dispersion, i.e. the nanodiamond material particles are substantially in single digit form in the liquid medium.

The nanodiamond material containing liquid medium in step (i) may also be in a form of suspension, i.e. the nanodiamond material particles are in part or substantially in agglomerated form in the liquid medium.

Preferably the nanodiamond material containing liquid medium in step (i) is in form of dispersion.

The nanodiamond material containing liquid medium nanodiamond material concentration can be adjusted.

The nanodiamond material is detonation nanodiamond material. That is, the nanodiamonds are produced by detonation method. In other words, the nanodiamonds originate from detonation synthesis. As the nanodiamonds originate from detonation synthesis the surface of nanodiamond material particles can contain several surface functionalities, such as amino, carboxylic acid and hydrogen functionalities.

Precursor nanodiamond material may be essentially pure nanodiamond material, preferably having a nanodiamond content of at least 87% by weight, more preferably at least 97% by weight. The nanodiamond material may contain graphite and amorphous carbon originating from the production of the nanodiamonds. They may also contain some residual metal impurities, either as metals, metal salts, in metal oxide, nitride or halogenate form.

In one embodiment of the present invention the nanodiamond particles may include detonation soot such as graphitic and amorphous carbon, the content of oxidisable carbon preferably being at least 5 wt.-%, more preferably at least 10 wt.-%.

Preferably zeta-potential value of the nanodiamond material exceeds ±35 mV as dispersed into water.

When the nanodiamond material is comprised of nanodiamond blend, reliable determination of nanodiamond blend material zeta-potential with presently available tools is challenging.

In one embodiment, surface of the nanodiamond material particles are functionalized to increase adherence into filler material surface. An example of such functionalized nanodiamond material particles is amino-functionalized nanodiamond material. Another example if such functionalized nanodiamond is carboxylic acid functionalized nanodiamond material particles, and still another example of such nanodiamond is hydrogen terminated nanodiamond material particles. Further examples of such functionalized nanodiamond material particles include hydroxyl-, thiol-, halogen-, ketone-, ester-, ether-, silyl-, epoxy-, cyano- and aldehyde functionalized nanodiamond material particles. The surface function is preferably covalently bound directly to nanodiamond material surface, but can also be located at a chain structure, this chain structure being covalently bound to nanodiamond material particle surface. Nanodiamond material particles are preferably functionalized predominantly with one type of active surface function, but can contain also two or several types of surface functions.

The adherence into filler material surface can be adjusted by using one or several types of surface functionalized nanodiamond material particles.

Further, the adherence into parent polymer material(s) can be adjusted by using one or several types of surface functionalized nanodiamond material particles.

The nanodiamond material nanodiamond particles in single digit form have an average primary particle size of from 1 nm to 10 nm, preferably from 2 nm to 8 nm, more preferably from 3 nm to 7 nm, and most preferably from 4 nm to 6 nm. Particle size of agglomerated form is between 5 nm and 1000 nm, preferably between 60 nm and 800 nm.

The liquid medium may be any suitable liquid medium. In one embodiment the liquid medium is selected from the group consisting of polar protic solvents, polar aprotic solvents, dipolar aprotic solvents, organic solvents or a mixture of the solvents.

The polar protic solvent is water, alcohol, linear aliphatic diol, branched diol and/or carboxylic acid.

The polar aprotic solvent is dichloromethane, tetrahydrofuran, propylene carbonate and/or lactam.

The dipolar aprotic solvent is ketone, ester, N,N-methylformamide and/or dimethyl sulfoxide.

The organic solvent is toluene or another aromatic solvent.

In a preferred embodiment the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), or a mixture of any said solvents.

Most preferably the liquid medium is water.

In one embodiment the suspension comprising the nanodiamond material, the at least one filler and the liquid medium is pre-treated prior step (ii). The composition is subjected to ultrasonication to reduce particle size distribution of the suspension.

In another embodiment of the suspension comprising the nanodiamond material, the composition is subjected to mechanical milling to reduce particle size distribution of the suspension.

In still another embodiment of the suspension comprising the nanodiamond material, the composition is subjected to BASD milling to reduce particle size distribution of the suspension.

In step (ii) the liquid medium is removed from the suspension of step (i) for producing the composition comprising at least one filler and nanodiamond material.

The removal of the liquid medium can be performed with any suitable method. Examples of such methods are drying at elevated temperature and/or vacuum.

In a preferred embodiment the composition after the liquid medium removal is substantially dry.

In one embodiment of the composition, the nanodiamond material has substantially adhered to surface of at least one filler material, but the liquid medium content is still above 10 wt. %.

The nanodiamond material substantially adheres on surface of the at least one filler material.

Active surface area of the composition of step (ii) is lower than active surface area of a composition that has been produced only by mixing dry nanodiamond material and filler material(s). That is, active surface area of the composition of step (ii) is lower, preferably at least 5% lower, than active surface area of a composition without the substantial adherence of nanodiamond material on surface of at least one filler material.

The comparison of the active surface area of the compositions is done with compositions having same amounts of nanodiamond material and filler material. Only difference is the method the composition is produced; method of the present invention and composition that has been produced only by mixing dry nanodiamond material and filler material.

Active surface area can be measured by for example BET-method.

The zeta-potential of composition is different to that of filler material. The zetapotential is driven in direction of composition contained nanodiamond material. Hence, the composition zeta-potential is predominantly determined by nanodiamond material particle zeta-potential properties on the composition contained filler particle surfaces.

The surface charge of composition is different to that of filler material. The surface charge is driven in direction of composition contained nanodiamond material. Hence, the composition surface charge is predominantly determined by nanodiamond material particle surface charge properties on the composition contained filler particle surfaces.

The composition contained particles surface properties affect the composition electrostatic interaction towards parent polymer(s) and facilitate the improved phonon transfer and thus, thermal conductivity throughout the formed thermal compound matrix.

Adhered nanodiamond material particle agglomerate size is less than 500 nm, preferably less than 300 nm, more preferably less than 100 nm and most preferably less than 50 nm.

In one embodiment, the nanodiamond material particle agglomerate size can exceed 500 nm.

In one further embodiment of invention, the nanodiamond material particle agglomerate size is exceeding 500 nm, and the nanodiamond material is nanodiamond particle contained nanodiamond blend material.

The composition of step (ii) comprising the at least one filler and nanodiamond material, the nanodiamond material on the filler surface is able to generate coupling effect to another material, such as polymer.

In one embodiment the composition is further treated by subjecting the composition to mechanical treatment to break up formed composition agglomerates. Preferably the mechanical treatment is beads milling.

In step (iii) the composition of step (ii) and at least one polymer are mixed for producing the nanodiamond containing thermal composite.

The polymer is selected from the group consisting of epoxies, silicones, thermoplastic polymer, acrylates, polyurethanes, polyesters, fluoropolymers, siloxanes, polyimides and mixtures thereof.

In a preferred embodiment the polymer is thermoplastic polymer or mixture of thermoplastic polymers. Examples of the thermoplastic polymer are Acrylonitrile butadiene styrene, Acrylic, Celluloid, Cellulose acetate, Cyclic Olefin Copolymer, Ethylene-Vinyl Acetate, Ethylene vinyl alcohol, Fluoroplastics such as polytetrafluoro ethylene, Ionomers, Liquid Crystal Polymer, Polyoxymethylene, Polyacrylates, Polyacrylonitrile, Polyamide, Polyamide-imide, Polyimide, Polyaryletherketone, Polybutadiene, Polybutylene, Polybutylene terephthalate, Polycaprolactone, Polychlorotrifluoroethylene, Polyether ether ketone, Polyethylene terephthalate, Polycyclohexylene dimethylene terephthalate, Polycarbonate, Polyhydroxyalkanoates, Polyketone, Polyester, Polyethylene, Polyetherketoneketone, Polyetherimide, Polyethersulfone, Polysulfone, Chlorinated Polyethylene, Polylactic acid, Polymethylmethacrylate, Polymethylpentene, Polyphenylene, Polyphenylene oxide, Polyphenylene sulfide, Polyphthalamide, Polypropylene, Polystyrene, Polysulfone, Polytrimethylene terephthalate, Polyurethane, Polyvinyl acetate, Polyvinyl chloride, Polyvinylidene chloride, and Styrene-acrylonitrile.

Preferably the thermoplastic polymer is Acrylonitrile butadiene styrene, Polyphenylene sulfide, Liquid Crystal Polymer, Polypropylene, Polyethylene, Polystyrene, Polysulfone, Polyetherimide, Polytrimethylene terephthalate, Polycarbonate, Polyamide, Polyphthalamide, and Polyether ether ketone, or a mixture thereof.

In another preferred embodiment the polymer is a silicone. The silicone can be available in neat polymer slurry form or in solvent dispersed form.

In still another preferred embodiment the polymer is an epoxy. The silicone can be available in neat polymer slurry form or in solvent dispersed form.

The mixing may be any known method where the composition of step (ii) is brought into contact with at least one polymer. Examples of such methods are mechanical mixing, mechanical mixing at elevated temperature and extrusion.

In one embodiment the composition of step (ii) and the at least one polymer is compounded at elevated temperature in an extruder.

Yet in another embodiment the composition of step (ii) and the at least one polymer is compounded and molded at elevated temperature for producing the nanodiamond containing thermal composite. The molding may be performed with any known technique, such as injection molding, compression molding and rotational molding. Preferably the molding is injection molding. In a preferred embodiment the compounding and molding are performed in a single apparatus, such as injection molding apparatus.

In one embodiment the polymer form is formed out of its monomer(s). The nanodiamond containing thermal composite is formed by curing the monomer(s) contained in a mixture said monomer(s) and nanodiamond contained compositions.

In one embodiment the polymer form is formed out of its monomer(s) dispersed in solvent(s). The nanodiamond containing thermal composite is formed by curing the monomer(s) contained in a mixture said monomer(s), solvent(s) and nanodiamond contained compositions.

Nanodiamond containing compositions can be added into liquid phase polymer(s), monomer(s) or their mixtures either as powders or in liquid dispersion/suspension form.

Optionally, additional components may be added to the step (iii). Examples of such components are surfactants such as titanate.

The nanodiamond containing thermal composite may be in different forms, such as articles, pellets and powder.

The produced nanodiamond containing thermal composite comprises nanodiamond material, at least one filler, and at least one polymer, wherein the nanodiamond material is substantially adhered on surface of the at least one filler material.

Average thermal conductivity of the composite is at least 5% higher than average thermal conductivity of a nanodiamond containing composite without the substantial adherence of nanodiamond material on surface of at least one filler material.

Preferably the average thermal conductivity of the composite is at least 20% higher than, preferably 50% higher than, more preferably 70% higher than average thermal conductivity of a nanodiamond containing composite without the substantial adherence of nanodiamond material on surface of at least one filler material.

The comparison of the average thermal conductivity of the composites is done with compositions having same amounts of nanodiamond material, filler material and polymer. Only difference is the method the composites are produced; method of the present invention, and composite that has been produced only by mixing dry nanodiamond material and filler material together followed by mixing with polymer material.

In a third aspect of the present invention there is provided a composition comprising nanodiamond material and at least one filler.

More particularly there is provided a composition comprising from 0.01 to 80 wt.-% of nanodiamond material, and from 1 to 99.99 wt.-% of at least one filler, wherein the nanodiamond material is substantially adhered on surface of the at least one filler.

Preferably the composition comprises 0.01 to 40 wt.-%, more preferably from 0.01 to 20 wt.-%, and most preferably from 0.01 to 5 wt.-% of the nanodiamond material.

Preferably the composition comprises from 10 to 90 wt-%, more preferably from 20 to 99.99 wt-%, even more preferably from 15 to 85 wt.-%, even more preferably 15 to 70 wt.-%, and most preferably from 20 to 50 wt.-% of the at least one filler.

In one embodiment the composition comprises from 0.01 to 5 wt. % of the nanodiamond material and from 95 to 99.99 wt.-% of the at least one filler.

Active surface area of the composition of the present invention is lower, preferably at least 5% lower, than active surface area of a composition without the substantial adherence of nanodiamond material on surface of at least one filler material.

The comparison of the active surface area of the compositions is done with compositions having same amounts of nanodiamond material and filler material. That is, only difference is that in the composition of the present invention the nanodiamond material is substantially adhered on the surface of the filler material, and in the compared composition there is no adherence.

Active surface area can be measured by for example BET-method.

The zeta-potential of composition is different to that of filler material. The zetapotential is driven in direction of composition contained nanodiamond material. Hence, the composition zeta-potential is predominantly determined by nanodiamond material particle zeta-potential properties on the composition contained filler particle surfaces.

The surface charge of composition is different to that of filler material. The surface charge is driven in direction of composition contained nanodiamond material. Hence, the composition surface charge is predominantly determined by nanodiamond material particle surface charge properties on the composition contained filler particle surfaces.

The composition contained particles surface properties affect the composition electrostatic interaction towards parent polymer(s) and facilitate the improved phonon transfer and thus, thermal conductivity throughout the formed thermal compound matrix.

Preferably the filler is selected from the group consisting of metal, metal oxide, metal nitride, metal carbide, carbon compound, silicon compound, boron compound such as boron nitride, ceramic materials, natural fibers, or the combinations thereof.

The carbon compound is selected from the group consisting of diamond material other than detonation diamond, graphite, carbon black, carbon fiber, graphene, oxidized graphene, carbon soot, carbon nanotube, pyrolytic carbon, carbon nitride, silicon carbide, aluminum carbide, or the combinations thereof.

The boron compound is selected from the group consisting of hexagonal or cubic boron nitride, boron carbide, or the combinations thereof. Preferably the boron compound is hexagonal boron nitride.

In one embodiment the filler is a mixture of boron nitride and aluminum oxide.

In one further embodiment the filler is a mixture of boron nitride, aluminum oxide and graphite.

The filler has an average primary particle size from 10 nm to 2000 µm, preferably 50 nm to 500 µm and more preferably 500 nm to 200 µm.

The nanodiamond material is detonation nanodiamond material. That is, the nanodiamonds are produced by detonation method. In other words, the nanodiamonds originate from detonation synthesis. As the nanodiamonds originate from detonation synthesis the surface of nanodiamond material particles can contain several surface functionalities, such as amino, carboxylic acid and hydrogen functionalities.

Precursor nanodiamond material may be essentially pure nanodiamond material, preferably having a nanodiamond content of at least 87% by weight, more preferably at least 97% by weight. The nanodiamond material may contain graphite and amorphous carbon originating from the production of the nanodiamonds. They may also contain some residual metal impurities, either as metals, metal salts or in metal oxide form.

In one embodiment of the present invention the nanodiamond particles may include detonation soot such as graphitic and amorphous carbon, the content of oxidisable carbon preferably being at least 5 wt.-%, more preferably at least 10 wt.-%.

Preferably zeta-potential value of the nanodiamond material exceeds ±35 mV as dispersed into water.

When the nanodiamond material is comprised of nanodiamond blend, reliable determination of nanodiamond blend material zeta-potential with presently available tools is challenging.

The nanodiamond material particles in single digit form have an average primary particle size of from 1 nm to 10 nm, preferably from 2 nm to 8 nm, more preferably from 3 nm to 7 nm, and most preferably from 4 nm to 6 nm. Particle size of agglomerated form is between 5 nm and 1000 nm, preferably between 60 nm and 800 nm.

In one embodiment, surface of the nanodiamond material particles are mono-functionalized to increase adherence into filler material surface. An example of such mono-functionalized nanodiamond material particles is amino-functionalized nanodiamond material.

Adhered nanodiamond material particle agglomerate size is less than 500 nm, preferably less than 300 nm, more preferably less than 100 nm and most preferably less than 50 nm.

The nanodiamond material on the filler surface is able to generate coupling effect to another material. The another material is selected from group of polymers, metals, ceramic materials or their mixtures.

In one embodiment the composition comprising the nanodiamond material and the at least one filler of the present invention is obtainable by the method disclosed above.

In a fourth aspect of the present invention there is provided a nanodiamond containing thermal composite comprising nanodiamond particles, at least one filler and at least one polymer.

More particularly there is provided a nanodiamond containing thermal composite comprising 0.01 to 80 wt.-% of nanodiamond material, from 1 to 90 wt.-% of at least one filler, and from 5 to 95 wt.-% of at least one polymer, wherein the nanodiamond material is substantially adhered on surface of the at least one filler material.

Preferably the composite comprises 0.01 to 40 wt.-%, preferably from 0.01 to 20 wt.-%, more preferably from 0.01 to 5 wt.-% of the nanodiamond material.

Preferably the composite comprises from 10 to 70 wt.-%, preferably 10 to 50 wt.-%, more preferably from 15 to 45 wt.-% of said at least one filler.

Preferably the composite comprises from 20 to 90 wt.-%, preferably from 50 to 85 wt.-% of the at least one polymer.

Average thermal conductivity of the composite is at least 5% higher than average thermal conductivity of a nanodiamond containing composite without the substantial adherence of nanodiamond material on surface of at least one filler material.

Preferably the average thermal conductivity of the composite is at least 20% higher than, preferably 50% higher than, more preferably 70% higher than average thermal conductivity of a nanodiamond containing composite without the substantial adherence of nanodiamond material on surface of at least one filler material.

The comparison of the average thermal conductivity of the composites is done with compositions having same amounts of nanodiamond material, filler material and polymer. Only difference is that in the composite of the present invention the nanodiamond material is substantially adhered on surface of the at least one filler material; and in the compared composite there is no adherence.

The polymer is selected from the group consisting of epoxies, silicones, thermoplastic polymer, acrylates, polyurethanes, polyesters, fluoropolymers, siloxanes, polyimides and mixtures thereof.

In a preferred embodiment the polymer is thermoplastic polymer or mixture of thermoplastic polymers. Examples of the thermoplastic polymer are Acrylonitrile butadiene styrene, Acrylic, Celluloid, Cellulose acetate, Cyclic Olefin Copolymer, Ethylene-Vinyl Acetate, Ethylene vinyl alcohol, Fluoroplastics such as polytetrafluoro ethylene, Ionomers, Liquid Crystal Polymer, Polyoxymethylene, Polyacrylates, Polyacrylonitrile, Polyamide, Polyamide-imide, Polyimide, Polyaryletherketone, Polybutadiene, Polybutylene, Polybutylene terephthalate, Polycaprolactone, Polychlorotrifluoroethylene, Polyether ether ketone, Polyethylene terephthalate, Polycyclohexylene dimethylene terephthalate, Polycarbonate, Polyhydroxyalkanoates, Polyketone, Polyester, Polyethylene, Polyetherketoneketone, Polyetherimide, Polyethersulfone, Polysulfone, Chlorinated Polyethylene, Polylactic acid, Polymethylmethacrylate, Polymethylpentene, Polyphenylene, Polyphenylene oxide, Polyphenylene sulfide, Polyphthalamide, Polypropylene, Polystyrene, Polysulfone, Polytrimethylene terephthalate, Polyurethane, Polyvinyl acetate, Polyvinyl chloride, Polyvinylidene chloride, and Styrene-acrylonitrile.

Preferably the thermoplastic polymer is Acrylonitrile butadiene styrene, Polyphenylene sulfide, Liquid Crystal Polymer, Polypropylene, Polyethylene, Polystyrene, Polysulfone, Polyetherimide, Polytrimethylene terephthalate, Polycarbonate, Polyamide, Polyphthalamide, and Polyether ether ketone, or a mixture thereof.

In another preferred embodiment the polymer is a silicone. The silicone can available in neat polymer slurry form or in solvent dispersed form.

In still another preferred embodiment the polymer is an epoxy. The silicone can available in neat polymer slurry form or in solvent dispersed form.

In one embodiment the polymer form is formed out of its monomer(s). The nanodiamond containing thermal composite is formed by curing the monomer(s) contained in a mixture said monomer(s) and nanodiamond contained compositions.

In one embodiment the polymer form is formed out of its monomer(s) dispersed in solvent(s). The nanodiamond containing thermal composite is formed by curing the monomer(s) contained in a mixture said monomer(s), solvent(s) and nanodiamond contained compositions.

Nanodiamond containing compositions can be added into liquid phase polymer(s), monomer(s) or their mixtures either as powders or in liquid dispersion/suspension form.

Preferably the filler is selected from the group consisting of metal, metal oxide, metal nitride, metal carbide, carbon compound, silicon compound, boron compound such as boron nitride, ceramic materials, natural fibers, or the combinations thereof.

The carbon compound is selected from the group consisting of diamond material other than detonation diamond, graphite, carbon black, carbon fiber, graphene, oxidized graphene, carbon soot, carbon nanotube, pyrolytic carbon, carbon nitride, silicon carbide, aluminum carbide, or the combinations thereof.

The boron compound is selected from the group consisting of hexagonal or cubic boron nitride, boron carbide, or the combinations thereof. Preferably the boron compound is hexagonal boron nitride.

In one embodiment the filler is a mixture of boron nitride, aluminum oxide and graphite.

The filler has an average primary particle size from 10 nm to 100 μm, preferably 50 nm to 50 μm and more preferably 500 nm to 20 μm.

The nanodiamond material is detonation nanodiamond material. That is, the nanodiamonds are produced by detonation method. In other words, the nanodiamonds originate from detonation synthesis. As the nanodiamonds originate from detonation synthesis the surface of nanodiamond material particles can contain several surface functionalities, such as amino, carboxylic acid and hydrogen functionalities.

Precursor nanodiamond material may be essentially pure nanodiamond material, preferably having a nanodiamond content of at least 87% by weight, more preferably at least 97% by weight. The nanodiamond material may contain graphite and amorphous carbon originating from the production of the nanodiamonds. They may also contain some residual metal impurities, either as metals, metal salts, in metal oxide, nitride or halogenate form.

In one embodiment of the present invention the nanodiamond particles may include detonation soot such as graphitic and amorphous carbon, the content of oxidisable carbon preferably being at least 5 wt.-%, more preferably at least 10 wt.-%.

Preferably zeta-potential value of the nanodiamond material exceeds ±35 mV as dispersed into water.

When the nanodiamond material is comprised of nanodiamond blend, reliable determination of nanodiamond blend material zeta-potential with presently available tools is challenging.

The nanodiamond material nanodiamond particles in single digit form have an average primary particle size of from 1 nm to 10 nm, preferably from 2 nm to 8 nm, more preferably from 3 nm to 7 nm, and most preferably from 4 nm to 6 nm. Particle size of agglomerated form is between 5 nm and 1000 nm, preferably between 60 nm and 800 nm.

In one embodiment, surface of the nanodiamond material particles are functionalized to increase adherence into filler material surface. An example of such functionalized nanodiamond material particles is amino-functionalized nanodiamond material. Another example if such functionalized nanodiamond is carboxylic acid functionalized nanodiamond material particles, and still another example of such nanodiamond is hydrogen terminated nanodiamond material particles. Further examples of such functionalized nanodiamond material particles include hydroxyl-, thiol-, halogen-, ketone-, ester-, ether-, silyl-, epoxy-, cyano- and aldehyde functionalized nanodiamond material particles. The surface function is preferably covalently bound directly to nanodiamond material surface, but can also be located at a chain structure, this chain structure being covalently bound to nanodiamond material particle surface. Nanodiamond material particles are preferably functionalized predominantly with one type of active surface function, but can contain also two or several types of surface functions.

The adherence into filler material surface can be adjusted by using one or several types of surface functionalized nanodiamond material particles.

Further, the adherence into parent polymer material(s) can be adjusted by using one or several types of surface functionalized nanodiamond material particles.

Adhered nanodiamond material particle agglomerate size is less than 500 nm, preferably less than 300 nm, more preferably less than 100 nm and most preferably less than 50 nm.

In one embodiment, the nanodiamond material particle agglomerate size can exceed 500 nm.

In one further embodiment of invention, the nanodiamond material particle agglomerate size is exceeding 500 nm, and the nanodiamond material is nanodiamond particle contained nanodiamond blend material.

The nanodiamond material on the filler surface is able to generate coupling effect to at least one polymer.

The nanodiamond containing thermal composite may be in different forms, such as articles, pellets and powder.

In one embodiment of invention, the nanodiamond containing thermal composite is available in solvent form, the nanodiamond contained thermal composite being dispersed or suspended in a suitable solvent. Such solvent form containing nanodiamond thermal composite can be cured to form solid or essentially solid nanodiamond containing thermal composite in film, coating, particle, article, pellet and powder forms.

In another embodiment of invention, the nanodiamond containing composition is added into a silicone, to form a nanodiamond containing thermal composite. Said silicone containing thermal composite can be cured by heating, photo-irradiation such as UV-light and/or by using catalysts. One especially preferred catalyst is platinum.

In another embodiment of invention, the nanodiamond containing composition is added to an epoxide, to form a nanodiamond containing thermal composite. Said epoxy containing thermal composite can be cured by heating, irradiation and/or by using hardener agents. One especially preferred hardener is amine-hardener.

In one embodiment, the nanodiamond containing thermal composite exhibits higher Young's modulus than the thermal composite having same total filler loading per weight, using the same filler(s) as a nanodiamond containing thermal composite.

In one embodiment, the nanodiamond containing thermal composite exhibits higher scratch resistance than the thermal composite having same total filler loading per weight, using the same filler(s) as a nanodiamond containing thermal composite.

In one embodiment, the nanodiamond containing thermal composite exhibits lower friction coefficient than the thermal composite having same total filler loading per weight, using the same filler(s) as a nanodiamond containing thermal composite.

In one embodiment the nanodiamond containing thermal composite comprising the nanodiamond material, the at least one filler and the at least one polymer of the present invention is obtainable by the method disclosed above.

In the following the present invention will be described in more detail by means of examples. The purpose of the examples is not to restrict the scope of the claims.

EXAMPLES

Example 1

According to Present Invention

This example represents preparation of thermally conducting, electrically insulating PA-66 compositions.

Materials

Polyamide-66 (PA-66):

PA-66 used in the tests was PA-66 grade Zytel 135F (powder PA-66), which is commercially available.

Boron Nitride:

Boron nitride used in the example was 15 micrometer hexagonal boron nitride powder Boronid® TCP015-100 available from ESK Ceramics GmbH.

Zeta-Positive Amino-Functionalized Nanodiamond Dispersion, in Water:

Zeta-positive amino-functionalized nanodiamond dispersion is a Carbodeon developed amino-functionalized nanodiamond dispersion with 5 wt. % nanodiamond concentration. Nanodiamond crystal size is 4-6 nm. Nanodiamond content in solid phase is ≥97 wt.-%. The nanodiamond particles of amino-functionalized nanodiamond dispersion are detonation nanodiamonds and their base value is minimum 10.0 and acid value less than 3.0 as measured by titration. The aqueous dispersion pH is minimum 8.0 as measured at 5 wt. % concentration. The amino-functionalized nanodiamond dispersion zeta-potential is at least +35 mV as measured from dispersion without any pH adjustments. The D90 particle size distribution of this grade is less than 30 nm. The applied aqueous amino-functionalized nanodiamond grade concentration was 5 wt. %.

Vox D, in Water

Product named "Vox D" (from company Carbodeon) contains spherical nanodiamond particles with predominantly carboxylic acid functionalized nanodiamond surface dispersed in water and a variety of other solvents. Nanodiamond crystal size is 4-6 nm. Nanodiamond content in solid phase is ≥97 wt.-%. "Vox D" is commercially available. The nanodiamond particles of "Vox D" are detonation nanodiamonds. The commercial dispersion zeta potential is typically at least −50 mV, and the D90 particle size distribution is less than 30 nm, preferably less than 15 nm. The applied aqueous Vox D grade nanodiamond concentration was 5 wt. %.

Hydrogen D, in Water

Product named "Hydrogen D" (from company Carbodeon) contains spherical nanodiamond particles with predominantly hydrogen functionalized nanodiamond surface, dispersed in a solvent and a variety of other solvents. Nanodiamond crystal size is 4-6 nm. Nanodiamond content in solid phase is ≥97 wt.-%. The commercial dispersion zeta potential is typically at least +40 mV as measured from aqueous dispersion without any pH adjustments, and the D90 particle size distribution is less than 30 nm, preferably less than 15 nm. The nanodiamond particles of "Hydrogen D" are detonation nanodiamonds. The applied aqueous dispersion concentration was 3.5 wt. %.

Preparation of Compositions from Nanodiamond Dispersions and Boron Nitride Filler:

Amino-2:

24.722 g of boron nitride and 5.5 ml of zeta-positive amino-functionalized nanodiamond dispersion (0.0275 g solids in 0.5 wt. % aqueous dispersion) were mixed together and subjected for one-minute treatment with Speed Mixer device (Speed Mixer DAC 150.1 FV). The zeta-positive amino-functionalized nanodiamond dispersion was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond blend material is well adhered on graphite particle surfaces. Part of this prepared composition was used to prepare a PA-66 compound containing 0.05 wt. % of zeta-positive amino-functionalized nanodiamonds and 44.95 wt. % of hexagonal boron nitride material (sample 4).

24.695 g of boron nitride and 11.0 ml of zeta-positive amino-functionalized nanodiamond dispersion (0.055 g solids in 0.5 wt. % aqueous dispersion) were mixed together and subjected for one-minute treatment with Speed Mixer device (Speed Mixer DAC 150.1 FV). The zeta-positive amino-functionalized nanodiamond dispersion was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are well adhered on boron nitride particle surfaces. Part of this prepared composition was used to prepare a PA-66 compound containing 0.1 wt. % of zeta-positive amino-functionalized nanodiamonds and 44.9 wt. % of hexagonal boron nitride material (sample 5).

48.95 g of boron nitride and 55.0 ml of zeta-positive amino-functionalized nanodiamond dispersion (0.55 g solids in 1.0 wt. % aqueous dispersion) were mixed together and subjected for one-minute treatment with Speed Mixer device (Speed Mixer DAC 150.1 FV). The zeta-positive amino-functionalized nanodiamond dispersion was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are well adhered on boron nitride particle surfaces. Part of this prepared composition was used to prepare a PA-66 compound containing 0.5 wt. % of zeta-positive amino-functionalized nanodiamonds and 44.5 wt. % of hexagonal boron nitride material (sample 6).

64.35 g of boron nitride and 33.0 ml of zeta-positive amino-functionalized nanodiamond dispersion (1.65 g solids in 5.0 wt. % aqueous dispersion) were mixed together and subjected for one-minute treatment with Speed Mixer device (Speed Mixer DAC 150.1 FV). The zeta-positive amino-functionalized nanodiamond dispersion was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are well adhered on boron nitride particle surfaces. Part of this prepared composition was used to prepare a PA-66 compound containing 0.5 wt. % of zeta-positive amino-functionalized nanodiamonds and 19.5 wt. % of hexagonal boron nitride material (sample 7).

Vox-2:

24.722 g of boron nitride and 5.5 ml of Vox D nanodiamond dispersion (0.0275 g solids in 0.5 wt. % aqueous dispersion) were mixed together and subjected for one-minute treatment with Speed Mixer device (Speed Mixer DAC 150.1 FV). The zeta-negative carboxylic acid-functionalized nanodiamond dispersion was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond blend material is well adhered on boron nitride particle surfaces. Part of this prepared composition was used to prepare a PA-66 compound containing 0.05 wt. % of zeta-negative carboxylic acid-functionalized nanodiamonds and 44.95 wt. % of hexagonal boron nitride material (sample 8).

24.695 g of boron nitride and 11.0 ml of zeta-negative carboxylic acid-functionalized nanodiamond dispersion Vox D (0.055 g solids in 0.5 wt. % aqueous dispersion) were mixed together and subjected for one-minute treatment with Speed Mixer device (Speed Mixer DAC 150.1 FV). The zeta-negative carboxylic acid-functionalized nanodiamond dispersion Vox D was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are well adhered on boron nitride particle surfaces. Part of this prepared composition was used to prepare a PA-66 compound containing 0.1 wt. % of zeta-negative carboxylic acid-functionalized nanodiamonds and 44.9 wt. % of hexagonal boron nitride material (sample 9).

47.85 g of boron nitride and 33.0 ml of zeta-negative carboxylic acid-functionalized nanodiamond dispersion Vox D (1.65 g solids in 5.0 wt. % aqueous dispersion) were mixed together and subjected for one-minute treatment with Speed Mixer device (Speed Mixer DAC 150.1 FV). The zeta-negative carboxylic acid-functionalized nanodiamond dispersion Vox D was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are well adhered on boron nitride particle surfaces. Part of this prepared composition was used to prepare a PA-66 compound containing 1.5 wt. % of zeta-negative carboxylic acid-functionalized nanodiamonds and 43.5 wt. % of hexagonal boron nitride material (sample 10).

61.05 g of boron nitride and 99.0 ml of zeta-negative carboxylic acid-functionalized nanodiamond dispersion Vox D (4.95 g solids in 5.0 wt. % aqueous dispersion) were mixed together and subjected for one-minute treatment with Speed Mixer device (Speed Mixer DAC 150.1 FV). The zeta-negative carboxylic acid-functionalized nanodiamond dispersion Vox D was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are well adhered on boron nitride particle surfaces. Part of this prepared composition was used to prepare a PA-66 compound containing 1.5 wt. % of zeta-negative carboxylic acid-functionalized nanodiamonds and 18.5 wt. % of hexagonal boron nitride material (sample 11).

Hydrogen-2:

21.89 g of boron nitride and 22.0 ml of zeta-positive hydrogen-functionalized nanodiamond dispersion Hydrogen D (0.11 g solids in 0.5 wt. % aqueous dispersion) were mixed together and subjected for one-minute treatment with Speed Mixer device (Speed Mixer DAC 150.1 FV). The zeta-positive hydrogen-functionalized nanodiamond dispersion Hydrogen D was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are substantially adhered on boron nitride particle surfaces. Part of this prepared composition was used to prepare a PA-66 compound containing 0.1 wt. % of zeta-positive hydrogen-functionalized nanodiamonds and 19.9 wt. % of hexagonal boron nitride material (sample 12).

24.695 g of boron nitride and 11.0 ml of zeta-positive hydrogen-functionalized nanodiamond dispersion Hydrogen D (0.055 g solids in 0.5 wt. % aqueous dispersion) were mixed together and subjected for one-minute treatment with Speed Mixer device (Speed Mixer DAC 150.1 FV). The zeta-positive hydrogen-functionalized nanodiamond dispersion Hydrogen D was evenly spread through boron nitride matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond particles are substantially adhered on boron nitride particle surfaces. Part of this prepared composition was used to prepare a PA-66 compound containing 0.1 wt. % of zeta-positive hydrogen-functionalized nanodiamonds and 49.9 wt. % of hexagonal boron nitride material (sample 13).

Processing

All materials were dried prior compounding (PA-66: 2 h/120° C. in a dry air dryer).

Compounding was done with Xplore15 micro-compounder and test pieces were injection molded with Thermo-Haake Minijet. Special mold (25*25*3 mm) was used for Minijet. Three similar composites of each series were produced for subsequent thermal conductivity and density analyses.

Sample 1: The PA-66 thermoplastic polymer was placed in the compounder. Temperature of compounding and moulding was 290° C. Rotation speed of the screws in compounding was 100 rpm and time of compounding was minimum 5 minutes. Temperature of the mould was 70° C. Packing time with 800 bar was 5 seconds and cooling time with 500 bar was 15 seconds with minijet. The samples total weight was 11 grams each. Sample 1 is a reference sample containing no fillers.

Samples 2-3: The boron nitride powder and PA-66 thermoplastic polymer were placed in the compounder. Temperature of compounding and moulding was 290° C. Rotation speed of the screws in compounding was 100 rpm and time of compounding was minimum 5 minutes. Temperature of the mould was 70° C. Packing time with 800 bar was 5 seconds and cooling time with 500 bar was 15 seconds with minijet. The samples total weight was 11 grams each, and the total filler loading was either 20 wt. % (Sample 2) or 45 wt. % (Sample 3). Samples 2 and 3 are representing reference samples containing boron nitride filler only.

Samples 4-14: PA-66 thermoplastic polymer and a composition comprising nanodiamonds dried on boron nitride particles were placed in the compounder. Temperature of compounding and moulding was 290° C. Rotation speed of the screws in compounding was 100 rpm and time of compounding was minimum 5 minutes. Temperature of the mould was 70° C. Packing time with 800 bar was 5 seconds and cooling time with 500 bar was 15 seconds with minijet. The samples total weight was 11 grams each, and the total filler loading was either 20 wt. % or 45 wt. %. When the sample total filler loading was 20 wt. % of the prepared sample, the boron nitride filler loading was varied between 18.5 to 19.95 wt. %, and the nanodiamond concentration was varied between 0.05 to 1.5 wt. % of the sample total weight. When the sample total filler loading was 45 wt. % of the prepared sample, the boron nitride filler loading was varied between 44.5 to 44.95 wt. %, and the nanodiamond concentration was varied between 0.05 to 0.5 wt. % of the sample total weight.

Analyses

The manufactured PA-66 thermal compound samples thermal conductivities ($\lambda$) were determined by laser flash method (ISO 18755; LFA 447, Netzsch GmbH), at ESK Ceramics GmbH, and as a reference material Pyroceram was used (5 measurements and averaging). The measured value is thermal diffusivity a, which value is measured in three spatial directions, i.e. x, y, and z directions (through-plane=z-sample, in-plane parallel to the molding direction=y-sample, in-plane perpendicular to the molding direction=x-sample). The measurements were carried out at room temperature (25° C.). The sample densities ($\rho$) were measured by the Archimedes method. The measurement on the z-sample was used to calculate the specific heat $C_P$. Using the density $\rho$, $C_P$, and a, the thermal conductivity was calculated according to $\lambda = a \cdot C_P \cdot \rho$.

Results

The results are summarized in Table 1. Error of density measurements is ±0.002 g/cm$^3$, error of thermal diffusivity measurement is ±5% and an error of calculated $C_P$ is up to 15%. Each sample specific heat values were the same for x, y and z directions and thus, only one value for each specific sample is represented.

TABLE 1

| Composites | Sample No. | Boron nitride % Wt. % | Composition Wt. % | Composition type | PA-66% Wt. % | Density g/cm3 | Thermal diffusivity mm2/s | Specific heat J/g/K | Thermal conductivity W/m · K |
|---|---|---|---|---|---|---|---|---|---|
| References | 1 | | | | 100.0 | 1.126 | X: 0.210; Y: 0.185; Z: 0.186 | 1.54 | X: 0.35 Y: 0.32 Z: 0.32 |
| | 2 | 20.0 | | | 80.0 | 1.264 | X: 0.595; Y: 0.641; Z: 0.322 | 1.44 | X: 1.09 Y: 1.17 Z: 0.59 |
| | 3 | 45.0 | | | 55.0 | 1.454 | X: 1.861; Y: 1.927; Z: 0.940 | 1.28 | X: 3.46 Y: 3.58 Z: 1.75 |
| Samples | 4 | 44.95 | 0.05 | Amino-2 | 55.0 | 1.452 | X: 1.913; Y: 2.257; Z: 0.706 | 1.42 | X: 3.93; Y: 4.64; Z: 1.45 |
| | 5 | 44.9 | 0.1 | Amino-2 | 55.0 | 1.454 | X: 2.131; Y: 2.187; Z: 0.645 | 1.60 | X: 4.94; Y: 5.07; Z: 1.50 |
| | 6 | 44.5 | 0.5 | Amino-2 | 55.0 | 1.449 | X: 1.970; Y: 2.081; Z: 1.039 | 1.40 | X: 4.00; Y: 4.22; Z: 2.11 |
| | 7 | 19.5 | 0.5 | Amino-2 | 80.0 | 1.263 | X: 0.665; Y: 0.697; Z: 0.334 | 1.46 | X: 1.22; Y: 1.28; Z: 0.63 |
| | 8 | 44.95 | 0.05 | Vox-2 | 55.0 | 1.447 | X: 2.154; Y: 2.277; Z: 0.822 | 1.50 | X: 4.66; Y: 4.93; Z: 1.78 |
| | 9 | 44.9 | 0.1 | Vox-2 | 55.0 | 1.447 | X: 2.073; Y: 2.233; Z: 0.750 | 1.43 | X: 4.29; Y: 4.62; Z: 1.55 |
| | 10 | 43.5 | 1.5 | Vox-2 | 55.0 | 1.450 | X: 2.220; Y: 2.119; Z: 0.974 | 1.34 | X: 4.32; Y: 4.12; Z: 1.90 |
| | 11 | 18.5 | 1.5 | Vox-2 | 80.0 | 1.255 | X: 2.200; Y: 0.720; Z: 0.340 | 1.43 | X: 3.95 Y: 1.29 Z: 0.61 |
| | 12 | 19.9 | 0.1 | Hydrogen-2 | 80.0 | 1.254 | X: 0.776; Y: 0.613; Z: 0.342 | 1.43 | X: 1.40; Y: 1.10; Z: 0.62 |
| | 13 | 44.9 | 0.1 | Hydrogen-2 | 80.0 | 1.449 | X: 1.945; Y: 2.009; Z: 0.706 | 1.42 | X: 4.01; Y: 4.15; Z: 1.46 |

Previously, it has been shown that milling nanodiamond filler together with boron nitride filler by ball milling prior to introducing the resulting filler mix into thermoplastic polymer itself is improving the thermal conductivities as compared to a method, where fillers are added separately to a thermoplastic matrix. As compared to a reference sample containing 45.0 wt. % of boron nitride filler (sample 3), a composition comprised of 44.95 wt. % boron nitride filler and 0.05 wt. % (Amino-2) improves the in-plane thermal conductivity by 21.9% and averaged thermal conductivity by 14.0% (sample 4). Hence, a remarkable improvement in thermal conductivities is available already by very low compound nanodiamond material concentrations.

As compared to a reference sample containing 45.0 wt. % of boron nitride filler (sample 3), using a composition comprised of 44.9 wt. % boron nitride filler and 0.1 wt. % (Amino-2) improves the in-plane thermal conductivity by 42.3% and averaged thermal conductivity by 31.1% (sample 5). This result has been reproduced by preparing an additional similar sample, resulting in 39.8% improvement in in-plane thermal conductivity and 34.1% improvement in averaged thermal conductivity (X: 4.58; Y: 5.26; Z: 1.96). If preparing a similar compound by mixing the boron nitride filler with amino-functionalized nanodiamond Molto Nuevo (lower degree of amino-functions as compared to that amino-functionalized nanodiamond material used in this example) with mechanical mixing as dry powders, and applying the resulting composition in compounding, the corresponding improvements are 25.0% in in-plane thermal conductivity and 24.9% improvement in averaged thermal conductivity.

Further, as compared to reference sample containing 45.0 wt. % of boron nitride filler (sample 3), using a composition comprised of 44.5 wt. % of boron nitride filler and 0.5 wt. % (Amino-2, sample 6) elevates the in-plane thermal conductivity by 16.8% and averaged thermal conductivity by 17.4%. If applying same concentration of boron nitride and zeta-positive amino-functionalized nanodiamond powder (a precursor for zeta-positive amino-functionalized nanodiamond dispersion manufacturing), milled together as dry powders prior compounding, the in-plane thermal conductivity is improved by 12.8% and averaged thermal conductivity by 11.9%.

Further, a composition comprised of 19.5 wt. % of boron nitride material and 0.5 wt. % of amino-functionalized nanodiamonds (Amino-2), the in-plane thermal conductivity is improved by 10.6% and averaged thermal conductivity by 11.8% (Sample 7), as compared to a reference sample comprised of 20 wt. % boron nitride in PA-66 matrix.

As compared to a reference sample containing 45.0 wt. % of boron nitride filler (sample 3), using a composition comprised of 44.95 wt. % boron nitride filler and 0.05 wt. % of carboxylated nanodiamond particles (Vox-2) improves the in-plane thermal conductivity by 36.3% and averaged thermal conductivity by 29.4% (sample 8). Hence, a remarkable improvement in thermal conductivities is available already by very low compound nanodiamond material concentrations.

As manufacturing the composite by using a composition of Vox-2 comprised of 44.9 wt. % of boron nitride filler and 0.1 wt. % of carboxylated nanodiamond particles, the in-plane thermal conductivity is improved by 26.7% and averaged thermal conductivity by 19.1% (sample 9), as compared to a reference sample comprised of 45 wt. % boron nitride fillers in PA-66 compound (sample 3).

As compared to a reference sample containing 45 wt. % of boron nitride filler (sample 3), a 19.9% improvement in in-plane thermal conductivity and 17.7% improvement in averaged thermal conductivity is available by using a Vox-2 composition comprised of 43.5% of boron nitride material and 1.5 wt. % of carboxylated nanodiamond particles (sample 10). If preparing the similar compound by mixing the boron nitride filler with carboxylated nanodiamond powder (a precursor for Vox D dispersion) with mechanical mixing as dry powders, and applying the resulting composition in compounding, no improvements in thermal conductivities can be detected. If preparing the sample by compounding the fillers in sequences, i.e. compounding first the carboxylated nanodiamond powder (Vox P), followed by compounding the boron nitride filler, no improvements in in-plane thermal conductivity are available, and only a minor improvement in a averaged thermal conductivity (1.1%) could be measured.

As compared to a reference sample containing 20 wt. % of boron nitride filler (sample 2), a 132% improvement in in-plane thermal conductivity and 105% improvement in averaged thermal conductivity is available by using a Vox-2 composition comprised of 18.5% of boron nitride material and 1.5 wt. % of carboxylated nanodiamond particles (sample 11). If preparing the similar compound by mixing the boron nitride filler with carboxylated nanodiamond powder (a precursor for Vox D dispersion) with mechanical mixing as dry powders, and applying the resulting composition in compounding, the corresponding improvements are 19.4% in in-plane thermal conductivity and 20.4% improvement in averaged thermal conductivity. If preparing the sample by compounding the fillers in sequences, i.e. compounding first the carboxylated nanodiamond powder (Vox P), followed by compounding the boron nitride filler, an improvement of 6.8% in in-plane thermal conductivity and similar improvement in a averaged thermal conductivity (6.8%) could be measured.

As compared to a reference sample containing 20 wt. % of boron nitride filler (sample 2), 10.6% improvement in in-plane thermal conductivity and 11.8% improvement in averaged thermal conductivity is available by using a Hydrogen-2 composition comprised of 19.9% wt. % of boron nitride material and 0.1 wt. % of hydrogen-functionalized nanodiamond particles (sample 12). If preparing the similar compound by mixing the boron nitride filler with hydrogen-functionalized nanodiamond powder (a precursor for Hydrogen D dispersion) with mechanical mixing as dry powders, and applying the resulting composition in compounding, no improvements in thermal conductivities can be detected.

As compared to a reference sample containing 45 wt. % of boron nitride filler (sample 3), 15.9% improvement in in-plane thermal conductivity and 9.6% improvement in averaged thermal conductivity is available by using a Hydrogen-2 composition comprised of 44.9 wt. % of boron nitride material and 0.1 wt. % of hydrogen-functionalized nanodiamond particles (sample 13). If preparing the similar compound by mixing the boron nitride filler with hydrogen-functionalized nanodiamond powder (a precursor for Hydrogen D dispersion) with mechanical mixing as dry powders, and applying the resulting composition in compounding, the corresponding improvement in in-plane thermal conductivity is 28.4% and 18.8% in averaged thermal conductivity. The results indicates that hydrogen terminated nanodiamond material particles might not have as high electrostatic interaction towards boron nitride particle surfaces as amino-functionalized and carboxylic acid functionalized nanodiamond particles have.

The further improved thermal conductivities are based on nanodiamond material particle surface created coupling effect between the filler material and parent polymer material. The improved wetting of filler material particles and polymers available by using highly thermally conductive, nanodiamond material particle adhered to filler particle surfaces (forming thermal compositions) is no doubt improving the phonon transfer and thus, thermal conductivities. The improvements are available already with very low concentrations of said compositions.

FIG. 1 shows PA-66 thermal composite based on 20 wt. % overall filler loading, wherein the nanodiamond material has been ball milled as dry powder together with hexagonal boron nitride filler. The compound nanodiamond concentration is 1.5 wt. % and hexagonal boron nitride concentration is 18.5 wt. %.

Figure 2:
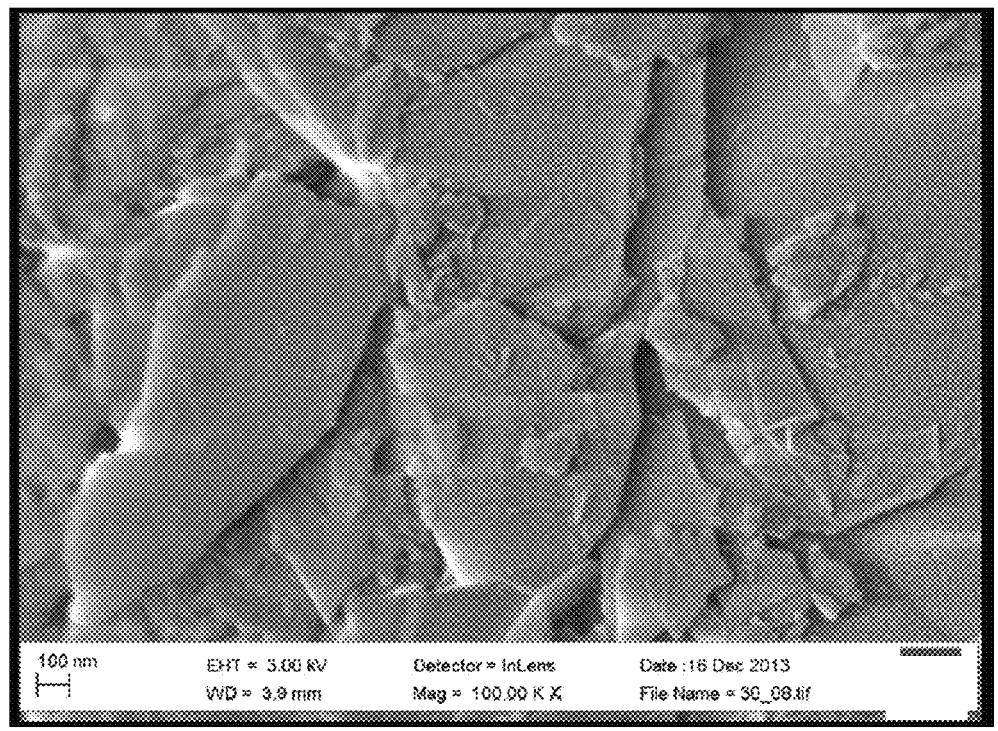
FIG. 2 shows PA-66 thermal composite according to the present invention based on 20 wt. % overall filler loading, wherein the nanodiamond material has been introduced onto hexagonal boron nitride filler surface in dispersion form, followed by drying the dispersion thereby adhering the nanodiamonds directly onto hexagonal boron nitride particles surface. The compound nanodiamond concentration is 1.5 wt. % and hexagonal boron nitride concentration is 18.5 wt. %.

FIG. 2 shows PA-66 thermal composite according to the present invention based on 20 wt. % overall filler loading, wherein the nanodiamond material has been introduced onto hexagonal boron nitride filler surface in dispersion form, followed by drying the dispersion thereby adhering the nanodiamonds directly onto hexagonal boron nitride particles surface. The compound nanodiamond concentration is 1.5 wt. % and hexagonal boron nitride concentration is 18.5 wt. %.

Example 2

According to Present Invention

This example represents preparation of thermally conducting, electrically insulating PA-66 compositions.
Materials
Polyamide-66 (PA-66):
PA-66 used in the tests was PA-66 grade Zytel 135F (powder PA-66), which is commercially available.
Graphite:
Graphite used in examples was TIMCAL TIMREX® KS5-75TT Primary Synthetic Graphite, having the following particle size: D10: 9.1 µm; D50 38.8 µm and D90: 70 µm.
Amino-Functionalized Nanodiamond Blend Powder, Titled Blend $NH_2$—P:
Zeta-positive amino-functionalized nanodiamond powder is a Carbodeon developed nanodiamond powder material prepared from nanodiamond blend by subjecting commercial nanodiamond blend into neat ammonia gas at 700° C. for six hours time. The nanodiamond particles of amino-functionalized nanodiamond blend suspension are detonation nanodiamonds and the produced amino-functionalized Blend material base value was 24.6 and acid value 1.7 as measured by titration.
Amino-Functionalized Nanodiamond Blend Suspension in Water, Titled Blend $NH_2$—S:
Zeta-positive amino-functionalized nanodiamond blend suspension is a Carbodeon developed nanodiamond suspension material prepared from nanodiamond blend by subjecting commercial nanodiamond blend powder into neat ammonia gas at 700° C. for six hours time, and suspending resulting powder into water assisted by ultrasonic treatment (Ultrasonic device: Hielscher UP400S (from company Hielscher)) for one hours time. The nanodiamond particles of amino-functionalized nanodiamond blend suspension are detonation nanodiamonds and the produced amino-functionalized blend material base value was 24.6 and acid value 1.7 as measured by titration. The blend nanodiamond concentration is varied between 50 to 70 wt. % and the nanodiamond particle concentration does not have any significant impact on suspension stability. The produced zeta-positive amino-functionalized nanodiamond blend aqueous suspension is substantially suspension stable for at least 6 month's time, and applied amino-functionalized Blend suspension Blend concentration was 1.5 wt. %
Hydrogen Functionalized Nanodiamond Blend Powder, Titled Blend H—P:
Zeta-positive hydrogen-functionalized nanodiamond powder is a Carbodeon developed nanodiamond powder material prepared from nanodiamond blend by subjecting commercial nanodiamond blend into 4% Hydrogen gas flow (in Argon) at 600° C. for six hours time. The nanodiamond particles of amino-functionalized nanodiamond dispersion are detonation nanodiamonds and the produced hydrogen-functionalized Blend material base value was 19.1 and acid value 3.0 as measured by titration.
Hydrogen-Functionalized Nanodiamond Blend Suspension in Water, Titled Blend H—S:
Zeta-positive hydrogen-functionalized nanodiamond blend suspension is a Carbodeon developed nanodiamond suspension material prepared from nanodiamond blend by subjecting commercial nanodiamond blend into 4% Hydrogen gas flow (in Argon) at 600° C. for six hours time, and suspending resulting powder into water assisted by ultrasonic treatment (Ultrasonic device: Hielscher UP400S (from company Hielscher)) for one hours time. The nanodiamond particles of amino-functionalized nanodiamond dispersion are detonation nanodiamonds and the produced hydrogen-functionalized Blend material base value was 19.1 and acid value 3.0 as measured by titration. The blend nanodiamond concentration is varied between 50 to 70 wt. % and the nanodiamond particle concentration does not have any significant impact on suspension stability. The produced zeta-positive hydrogen-functionalized nanodiamond blend aqueous suspension is substantially suspension stable for at least 6 months time, and applied hydrogen-functionalized Blend suspension Blend concentration was 1.5 wt. %

Preparation of Compositions from Nanodiamond Blend Powders and Graphite Filler:

Blend N-1:

21.78 g of graphite and 0.22 g of Blend $NH_2$—P powder were mixed together by ball milling, applying Retzch 100 PM100 ball milling tool (30 minutes, 200 rpm; wolfram carbide balls (10 mm), wolfram carbide container).

Blend H-1:

21.78 g of graphite and 0.22 g of Blend H—P powder were mixed together by ball milling, applying Retzch 100 PM100 ball milling tool (30 minutes, 200 rpm; wolfram carbide balls (10 mm), wolfram carbide container).

Preparation of Compositions from Nanodiamond Blend Suspensions and Graphite Filler:

Blend N-2:

21.78 g of graphite and 14.67 ml of Blend $NH_2$—S suspension (0.22 g solids in 1.5 wt. % aqueous suspension) were mixed together and subjected for one-minute treatment with Speed Mixer device (Speed Mixer DAC 150.1 FV). The Blend $NH_2$—S suspension was evenly spread through graphite matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond blend material is well adhered on graphite particle surfaces.

Blend H-2:

21.78 g of graphite and 14.67 ml of Blend H—S suspension (0.22 g solids in 1.5 wt. % aqueous suspension) were mixed together and subjected for one-minute treatment with Speed Mixer device (Speed Mixer DAC 150.1 FV). The Blend H—S suspension was evenly spread through graphite matrix. The resulting mixture was dried overnight in oven (at 80° C.) and the dried material was subjected to ball milling, applying Retzch 100 PM100 ball milling tool (30 minutes, 200 rpm; wolfram carbide balls (10 mm), wolfram carbide container), to give a composition wherein nanodiamond blend material is well adhered on graphite particle surfaces.

Processing

All materials were dried prior compounding (PA-66: 2 h/120° C. in a dry air dryer).

Compounding was done with Xplore15 micro-compounder and test pieces were injection molded with Thermo-Haake Minijet. Special mold (25*25*3 mm) was used for Minijet. Three similar composites of each series were produced for subsequent thermal conductivity and density analyses.

Sample 40: The graphite powder and PA-66 thermoplastic polymer to prepare a reference sample containing 50 wt. % graphite material were placed in the compounder. Temperature of compounding and moulding was 290° C. Rotation speed of the screws in compounding was 100 rpm and time of compounding was minimum 5 minutes. Temperature of the mould was 70° C. Packing time with 800 bar was 5 seconds and cooling time with 500 bar was 15 seconds with minijet.

Samples 41-44: The compositions Blend N-1, Blend N-2, Blend H-1, Blend H-2 and PA-66 thermoplastic polymer were compounded as depicted for sample 40. Temperature of compounding and moulding was 290° C. Rotation speed of the screws in compounding was 100 rpm and time of compounding was minimum 5 minutes. Temperature of the mould was 70° C. Packing time with 800 bar was 5 seconds and cooling time with 500 bar was 15 seconds with minijet. The samples total weight was 11 grams each, and the total filler loading was 50 wt. %. The graphite filler loading was 49.5 wt. %, and blend composition loading was 0.5 wt. % of the sample total weight.

Results

The results are summarized in Table 2. Error of density measurements is ±0.002 g/cm$^3$, error of thermal diffusivity measurement is ±5% and an error of calculated $C_P$ is up to 15%. Each sample specific heat values were the same for x, y and z directions and thus, only one value for each specific sample is represented.

TABLE 2

| Composites | Sample Nr. | Graphite Wt. % | Composition Wt. % | Composition type | PA-66% Wt. % | Density g/cm3 | Thermal diffusivity mm2/s | Specific heat J/g/K | Thermal conductivity W/m · K |
|---|---|---|---|---|---|---|---|---|---|
| References | 1 | | | | 100.0 | 1.126 | X: 0.210; Y: 0.185; Z: 0.186 | 1.54 | X: 0.35 Y: 0.32 Z: 0.32 |
| | 40 | 50.0 | | | 50.0 | 1.487 | X: 3.561; Y: 4.444; Z: 1.384 | 1.21 | X: 6.40; Y: 7.99; Z: 2.49 |
| Samples | 41 | 49.5 | 0.5 | Blend N-1 | 50.0 | 1.506 | X: 3.847; Y: 4.805; Z: 1.389 | 1.27 | X: 7.37 Y: 9.20 Z: 2.66 |
| | 42 | 49.5 | 0.5 | Blend N-2 | 50.0 | 1.497 | X: 4.250; Y: 4.502; Z: 1.395 | 1.48 | X: 9.39 Y: 9.95 Z: 3.08 |
| | 43 | 49.5 | 0.5 | Blend H-1 | 50.0 | 1.505 | X: 3.985; Y: 3.850; Z: 1.384 | 1.40 | X: 8.41 Y: 8.13 Z: 2.92 |
| | 44 | 49.5 | 0.5 | Blend H-2 | 50.0 | 1.500 | X: 4.235; Y: 4.485; Z: 1.094 | 1.44 | X: 9.14 Y: 9.68 Z: 2.36 |

From the results it can be seen that already a minor addition of nanodiamond containing composition can markedly improve both in-plane (x and y) and through-plane thermal conductivities. Also way of introducing nanodiamond material into the compound is having a significant impact on product final thermal conductivity properties.

Previously, it has been shown that milling nanodiamond filler together with boron nitride filler by ball milling prior introducing the resulting filler mix into thermoplastic polymer itself is improving the thermal conductivities as compared to a method, where fillers are added separately to thermoplastic matrix. As compared to a reference sample containing 50.0 wt. % of graphite filler (sample 40), a composite comprised of 49.5 wt. % graphite filler and 0.5 wt. % of composition Blend N-1 improves the in-plane thermal conductivity by 15.1% and averaged thermal conductivity by 13.9% (sample 41). The results are very much in line with those available by similar level replacement of graphite filler with composition Blend H-1, wherein the improvement as compared to 50% wt. % graphite contained reference sample in in-plane thermal conductivity was measured into 14.9% and 15.3% on averaged thermal conductivity (sample 43).

A similar composite (sample 42) comprised of 49.5 wt. % graphite filler and 0.5 wt. % of composition Blend N-2 with improved adhesion of nanodiamond Blend material into graphite particles surface gave a 34.3% improvement in in-plane thermal conductivity and 32.7% improvement in averaged thermal conductivity, as compared to 50% wt. % graphite contained reference sample. The improvements in thermal conductivities are more than 100% higher as compared to mixing the graphite filler and same Blend N filler in its dry state (sample 41). Further, a similar composite comprised of 49.5 wt. % graphite filler and 0.5 wt. % of composition Blend H-2 (sample 44) with improved adhesion of nanodiamond Blend material into graphite particles surface gave a 30.7% improvement in in-plane thermal conductivity and 25.4% improvement in averaged thermal conductivity, as compared to 50% wt. % graphite contained reference sample. Again, around 100% improvement in thermal conductivities was received as compared to mixing the graphite filler and same Blend N filler in its dry state (sample 43), demonstrating effectively the importance of distributing nanodiamond material directly on other filler material surface.

The further improved thermal conductivities are at least in part based on nanodiamond material created coupling effect between the filler material and parent polymer material. The improved wetting of filler material particles and polymers available by using highly thermally conductive, nanodiamond material particle adhered to filler particle surfaces (forming thermal compositions) is no doubt improving the phonon transfer and thus, thermal conductivities. The improvements are available already with very low concentrations of said compositions

The invention claimed is:

1. A method for producing a composition comprising at least one filler and a nanodiamond material, wherein the method comprises
    (i) a nanodiamond material containing liquid medium is brought into contact with at least one filler for producing a suspension;
    (ii) the liquid medium is removed from the suspension of step (i) for producing the composition comprising the at least one filler and the nanodiamond material.

2. The method according to claim 1, wherein the nanodiamond material containing liquid medium in step (i) is in a form of dispersion.

3. The method according to claim 1, wherein the nanodiamond material containing liquid medium in step (i) is in a form of suspension.

4. The method according to claim 1 wherein the liquid medium is selected from the group consisting of polar protic solvents, polar aprotic solvents, dipolar aprotic solvents, organic solvents and mixtures thereof.

5. The method according to claim 4, wherein the polar protic solvent is water, an alcohol, linear aliphatic diol, branched diol or a carboxylic acid, the polar aprotic solvent is dichloromethane, tetrahydrofuran, propylene carbonate or a lactam, the dipolar aprotic solvent is a ketone, ester, N,N-methylformamide or dimethyl sulfoxide and the organic solvent is toluene or an aromatic solvent.

6. The method according to claim 4, wherein the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), and mixtures of any said solvents.

7. The method according to claim 1, wherein the filler is selected from the group consisting of metal, metal oxide, metal nitride, metal carbide, carbon compound, silicon compound, boron compound, ceramic materials, natural fibers, and combinations thereof.

8. The method according to claim 7, wherein the carbon compound is selected from the group consisting of diamond material other than detonation diamond, graphite, carbon black, carbon fiber, graphene, oxidized graphene, carbon soot, carbon nanotube, pyrolytic carbon, silicon carbide, aluminum carbide, carbon nitride, and combinations thereof.

9. The method according to claim 7, wherein the boron compound is selected from the group consisting of hexagonal or cubic boron nitride, boron carbide, and combinations thereof.

10. The method according to claim 1, wherein in step (i) the nanodiamond material containing liquid medium is mechanically mixed with the at least one filler, preferably the mixing is performed with a speed mixer.

11. The method according to claim 1, wherein the composition is subjected to mechanical treatment to break up formed composition agglomerates, preferably the mechanical treatment is beads milling.

12. The method according to claim 1, wherein the nanodiamond material substantially adheres on the surface of the at least one filler material.

13. The method according to claim 12, wherein adhered nanodiamond material particle agglomerate size is less than 500 nm, preferably less than 300 nm, more preferably less than 100 nm and most preferably less than 50 nm.

14. The method according claim 12, wherein the nanodiamond material on the filler surface is able to generate coupling effect to another material.

15. The method according to claim 14, wherein the another material is selected from polymers, metals, ceramic materials or their mixtures.

16. The method according to claim 1, wherein zeta-potential value of the nanodiamond material exceeds ±35 mV as dispersed into water.

17. A method for producing a nanodiamond containing thermal composite, wherein the method comprises
    (i) nanodiamond material containing liquid medium is brought into contact with at least one filler for producing a suspension;
    (ii) the liquid medium is removed from the suspension of step (i) for producing a composition comprising at least one filler and nanodiamond material; and
    (iii) the composition of step (ii) and at least one polymer are mixed for producing the nanodiamond containing thermal composite.

18. The method according to claim 17, wherein the nanodiamond material containing liquid medium in step (i) is in a form of dispersion.

19. The method according to claim 18, wherein the composition of step (ii) is subjected to mechanical treatment to break up formed filler agglomerates prior step (iii), preferably the mechanical treatment is beads milling.

20. The method according to claim 17, wherein the nanodiamond material containing liquid medium in step (i) is in a form of suspension.

21. The method according to claim 17, wherein the liquid medium is selected from the group consisting of polar protic solvents, polar aprotic solvents, dipolar aprotic solvents, organic solvents and mixtures thereof.

22. The method according to claim 21, wherein the polar protic solvent is water, an alcohol, linear aliphatic diol, branched diol or a carboxylic acid, the polar aprotic solvent is dichloromethane, tetrahydrofuran, propylene carbonate or a lactam, the dipolar aprotic solvent is a ketone, an ester, N,N-methylformamide or dimethyl sulfoxide and the organic solvent is toluene or an aromatic solvent.

23. The method according to claim 21, wherein the liquid medium is selected from the group consisting of water, methanol, ethanol, iso-propanol, linear aliphatic diols, branched diols, N-methyl-2-pyrrolidone (NMP), N-ethyl-2-pyrrolidone (NEP) and dimethyl sulfoxide (DMSO), and mixtures of any said solvents.

24. The method according to claim 17, wherein the filler is selected from the group consisting of metal, metal oxide, metal nitride, metal carbide, carbon compound, silicon compound, boron compound, ceramic materials, natural fibers, and combinations thereof.

25. The method according to claim 24, wherein the carbon compound is selected from the group consisting of diamond material other than detonation diamond, graphite, carbon black, carbon fiber, graphene, oxidized graphene, carbon soot, carbon nanotube, pyrolytic carbon, silicon carbide, aluminum carbide, carbon nitride, and combinations thereof.

26. The method according to claim 24, wherein the boron compound is selected from the group consisting of hexagonal or cubic boron nitride, boron carbide, and combinations thereof.

27. The method according to claim 17, wherein in step (i) the nanodiamond material containing liquid medium is mechanically mixed with the at least one filler, preferably the mixing is performed with a speed mixer.

28. The method according to claim 17, wherein the nanodiamond material substantially adheres on surface of the at least one filler material.

29. The method according to claim 28, wherein adhered nanodiamond material particle agglomerate size is less than 500 nm, preferably less than 300 nm, more preferably less than 100 nm and most preferably less than 50 nm.

30. The method according to claim 28 wherein the nanodiamond material on the filler surface is able to generate coupling effect to the at least one polymer material.

31. The method according to claim 17, wherein zeta-potential value of the nanodiamond material exceeds ±35 mV as dispersed into water.

32. The method according to claim 17, wherein the at least one polymer is selected from the group consisting of epoxies, silicones, thermoplastic polymer, acrylates, polyurethanes, polyesters, fluoropolymers, siloxanes, polyimides and mixtures thereof.

33. A composition comprising from 0.01 to 80 wt. % of nanodiamond material, and from 1 to 99.99 wt. % of at least one filler, wherein the nanodiamond material is substantially adhered on the surface of the at least one filler by bringing nanodiamond material containing liquid medium into contact with the at least one filler and removing the liquid medium.

34. The composition according to claim 33, wherein active surface area of the composition is lower than active surface area of a composition without the substantial adherence of nanodiamond material on surface of at least one filler material.

35. The composition according to claim 34, wherein the active surface area of the composition is at least 5% lower than active surface area of a composition without the substantial adherence of nanodiamond material on surface of at least one filler material.

36. The composition according to claim 33, wherein the composition comprises 0.01 to 40 wt.-%, preferably from 0.01 to 20 wt.-%, more preferably from 0.01 to 5 wt.-% of the nanodiamond material.

37. The composition according to claim 33, wherein the composition comprises from 10 to 90 wt.-%, preferably 15 to 85 wt.-%, more preferably from 15 to 70 wt.-%, and most preferably 20-50 wt.-% of the at least one filler.

38. The composition according to claim 33, wherein the filler is selected from the group consisting of metal, metal oxide, metal nitride, metal carbide, carbon compound, silicon compound, boron compound such as boron nitride, ceramic materials, natural fibers, and combinations thereof.

39. The composition according to claim 38, wherein the carbon compound is selected from the group consisting of diamond material other than detonation diamond, graphite, carbon black, carbon fiber, graphene, oxidized graphene, carbon soot, carbon nanotube, pyrolytic carbon, silicon carbide, aluminum carbide, carbon nitride, and combinations thereof.

40. The composition according to claim 38, wherein said boron compound is selected from the group consisting of hexagonal or cubic boron nitride, boron carbide, and combinations thereof.

41. The composition according to claim 33, wherein the nanodiamond material particles have an average primary particle size from 1 nm to 10 nm, preferably from 2 nm to 8 nm, more preferably from 3 nm to 7 nm, and most preferably from 4 nm to 6 nm.

42. The composition according to claim 33, wherein the at least one filler has an average primary particle size from 10 nm to 2000 µm, preferably 50 nm to 500 µm and more preferably 500 nm to 200 µm.

43. The composition according to claim 33, wherein adhered nanodiamond material particle agglomerate size is less than 500 nm, preferably less than 300 nm, more preferably less than 100 nm and most preferably less than 50 nm.

44. The composition according to claim 33, wherein the nanodiamond material on the filler surface is able to generate coupling effect to another material.

45. The composition according to claim 44, wherein the another material is selected from group of polymers, metals, ceramic materials or their mixtures.

46. The composition according claim 33, wherein zeta-potential value of the nanodiamond material exceeds ±35 mV as dispersed into water.

47. A nanodiamond containing thermal composite comprising 0.01 to 80 wt. % of nanodiamond material, from 1 to 90 wt. % of at least one filler, and from 5 to 95 wt.-% of at least one polymer, wherein the nanodiamond material is substantially adhered on the surface of the at least one filler material by bringing nanodiamond material containing liquid medium into contact with the at least one filler and removing the liquid medium.

48. The nanodiamond containing thermal composite according to claim 47, wherein average thermal conductivity of the composite is at least 5% higher than average thermal conductivity a nanodiamond containing composite without the substantial adherence of nanodiamond material on the surface of at least one filler material.

49. The nanodiamond containing thermal composite according to claim 47, wherein the average thermal conductivity of the composite is at least 20% higher than, preferably 50% higher than, more preferably 70% higher than average thermal conductivity of a nanodiamond containing composite without the substantial adherence of nanodiamond material on the surface of at least one filler material.

50. The nanodiamond containing thermal composite according to claim 47, wherein the composite comprises from 0.01 to 40 wt.-%, preferably from 0.01 to 20 wt.-%, more preferably from 0.01 to 5 wt.-% of the nanodiamond material.

51. The nanodiamond containing thermal composite according to claim 47, wherein the composite comprises from 10 to 70 wt.-%, preferably 10 to 50 wt.-%, more preferably from 15 to 45 wt.-% of said at least one filler.

52. The nanodiamond containing thermal composite according to claim 47, wherein the composite comprises from 20 to 90 wt.-%, preferably from 50 to 85 wt.-% of the at least one polymer.

53. The nanodiamond containing thermal composite according to claim 47, wherein the at least one polymer is selected from the group consisting of epoxies, silicones, thermoplastic polymer, acrylates, polyurethanes, polyesters, fluoropolymers, siloxanes, polyimides and mixtures thereof.

54. The nanodiamond containing thermal composite according to claim 47, wherein the filler is selected from the group consisting of metal, metal oxide, metal nitride, metal carbide, carbon compound, silicon compound, boron compound, ceramic materials, natural fibers, and combinations thereof.

55. The nanodiamond containing thermal composite according to claim 54, wherein the carbon compound is selected from the group consisting of diamond material other than detonation diamond, graphite, carbon black, carbon fiber, graphene, oxidized graphene, carbon soot, carbon nanotube, pyrolytic carbon, silicon carbide, aluminum carbide, carbon nitride, and combinations thereof.

56. The nanodiamond containing thermal composite according to claim 54, wherein the boron compound is selected from the group consisting of hexagonal or cubic boron nitride, boron carbide, and combinations thereof.

57. The nanodiamond containing thermal composite according to claim 47, wherein the nanodiamond material particles have an average primary particle size from 1 nm to 10 nm, preferably from 2 nm to 8 nm, more preferably from 3 nm to 7 nm, and most preferably from 4 nm to 6 nm.

58. The nanodiamond containing thermal composite according to claim 47 wherein the at least one filler has an average primary particle size from 10 nm to 2000 μm, preferably 50 nm to 500 μm and more preferably 500 nm to 200 μm.

59. The nanodiamond containing thermal composite according to claim 47, wherein adhered nanodiamond material particle agglomerate size is less than 500 nm, preferably less than 300 nm, more preferably less than 100 nm and most preferably less than 50 nm.

60. The composition according to claim 47, wherein the nanodiamond material on the filler surface is able to generate coupling effect to the at least one polymer.

61. The composition according claim 47, wherein zeta-potential value of the nanodiamond material exceeds ±35 mV as dispersed into water.

\* \* \* \* \*